(12) United States Patent
Murai

(10) Patent No.: US 9,244,723 B2
(45) Date of Patent: Jan. 26, 2016

(54) MEDIUM, METHOD, AND APPARATUS

(71) Applicant: FUJITSU LIMITED, Kawasaki-shi, Kanagawa (JP)

(72) Inventor: Toru Murai, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/513,648

(22) Filed: Oct. 14, 2014

(65) Prior Publication Data
US 2015/0135199 A1    May 14, 2015

(30) Foreign Application Priority Data

Nov. 13, 2013   (JP) .................................. 2013-235467

(51) Int. Cl.
| | |
|---|---|
| *G06F 3/00* | (2006.01) |
| *G06F 9/52* | (2006.01) |
| *G06F 9/46* | (2006.01) |
| *G06F 9/48* | (2006.01) |
| *G06F 9/54* | (2006.01) |
| *G06F 1/26* | (2006.01) |

(52) U.S. Cl.
CPC .................. *G06F 9/466* (2013.01); *G06F 1/26* (2013.01); *G06F 9/4843* (2013.01); *G06F 9/54* (2013.01)

(58) Field of Classification Search
CPC .......... G06F 9/54; G06F 1/26; G06F 9/4843; G06Q 10/06311
USPC ........... 719/310; 705/7.22; 713/300; 718/106
See application file for complete search history.

(56) References Cited

U.S. PATENT DOCUMENTS

| | | | | |
|---|---|---|---|---|
| 6,226,694 | B1* | 5/2001 | Constant et al. ............... | 713/375 |
| 2003/0057280 | A1* | 3/2003 | Mandile ........................ | 235/454 |
| 2009/0287874 | A1* | 11/2009 | Rogers et al. ................. | 711/103 |
| 2013/0173777 | A1* | 7/2013 | Fu et al. ........................ | 709/224 |
| 2014/0089117 | A1* | 3/2014 | Schumacher ................... | 705/21 |
| 2014/0279334 | A1* | 9/2014 | Leuer et al. ..................... | 705/35 |

FOREIGN PATENT DOCUMENTS

| | | |
|---|---|---|
| JP | 2005-275908 | 10/2005 |
| JP | 2006-190029 | 7/2006 |
| JP | 2011-253231 | 12/2011 |

OTHER PUBLICATIONS

Jae Woong Chung, The Common Case Transaction Behaviour of Multithreaded Programs, 2006.*

* cited by examiner

*Primary Examiner* — Lechi Truong
(74) *Attorney, Agent, or Firm* — Staas & Halsey LLP

(57) ABSTRACT

A non-transitory computer-readable medium including a program which, when executed by a computer, causes the computer to detect completion of one or more processes executed in at least one of the computer and another computer; determine whether the completion of the one or more processes corresponds to a process completion pattern when a specific transactional operation is completed in at least the one of the computer and the another computer; and determine that the specific transactional operation is completed when it is determined that the completion of the one or more processes corresponds to the process completion pattern.

5 Claims, 23 Drawing Sheets

FIRST TIME

| PARENT PROCESS A-0 |
| PARENT PROCESS A-1 |
| PARENT PROCESS A-2 |
| PARENT PROCESS A-3 |
| PARENT PROCESS A-4 |

STOP ORDER (5)
STOP ORDER (4)
STOP ORDER (3)
STOP ORDER (2)
STOP ORDER (1)

SECOND TIME····

| PARENT PROCESS A-0 |
| PARENT PROCESS A-1 |
| PARENT PROCESS A-2 |
| PARENT PROCESS A-4 |
| PARENT PROCESS A-3 |

FIG. 7

FIRST TIME

| PARENT PROCESS A-0 | STOP ORDER (5) | PROCESS X-0 |
| PARENT PROCESS A-1 | STOP ORDER (4) | PROCESS X-1 |
| PARENT PROCESS A-2 | STOP ORDER (3) | PROCESS X-2 |
| PARENT PROCESS A-3 | STOP ORDER (2) | PROCESS X-4 |
| PARENT PROCESS A-4 | STOP ORDER (1) | PROCESS X-3 |

SECOND TIME

| PARENT PROCESS A-0 | STOP ORDER (5) | PROCESS X-0 |
| PARENT PROCESS A-1 | STOP ORDER (4) | PROCESS X-1 |
| PARENT PROCESS A-2 | STOP ORDER (3) | PROCESS X-2 |
| PARENT PROCESS A-4 | STOP ORDER (2) | PROCESS X-3 |
| PARENT PROCESS A-3 | STOP ORDER (1) | PROCESS X-4 |

MEDIUM, METHOD, AND APPARATUS

CROSS-REFERENCE TO RELATED APPLICATION

This application is based upon and claims the benefit of priority of the prior Japanese Patent Application No. 2013-235467, filed on Nov. 13, 2013, the entire contents of which are incorporated herein by reference.

FIELD

The embodiment discussed herein is related to a medium, a method, and an apparatus.

BACKGROUND

In transactional operation performed by an information processing apparatus, a monitoring device monitors occurrence of an abnormality. When the information processing apparatus performs switching to other transactional operation, the monitoring device switches the monitoring policy accordingly. Switching of the monitoring policy is performed when, for example, the planned completion time of the transactional operation in a computer defined in the schedule of a business system has passed. A monitoring technique of related art is disclosed in Japanese Laid-open Patent Publication No. 2005-275908, for example.

SUMMARY

According to an aspect of the invention, a non-transitory computer-readable medium including a program which, when executed by a computer, causes the computer to detect completion of one or more processes executed in at least one of the computer and another computer; determine whether the completion of the one or more processes corresponds to a process completion pattern when a specific transactional operation is completed in at least the one of the computer and the another computer; and determine that the specific transactional operation is completed when it is determined that the completion of the one or more processes corresponds to the process completion pattern.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 depicts an example of identifying the processes that finish executing in a planned shutdown period;

DESCRIPTION OF EMBODIMENT

According to the study by the inventor, the prediction of the end time of transactional operation in a computer may be difficult. For example, when multiple pieces of transactional operation in a computer are performed concurrently, it take more time than in the case in which the multiple pieces of transactional operation in a computer are performed individually. In addition, when, for example, the amount of data processed by the transactional operation in a computer varies, the prediction of the end time of transactional operation in a computer is difficult.

If transactional operation in a computer is not completed at the predicted end time, it may be difficult to appropriately monitor transactional operation in a computer performed by an information processing apparatus. For example, if the transactional operation in a computer is not completed at a predicted end time due to occurrence of a processing delay in an information processing apparatus, the monitoring policy to be originally applied to transactional operation in a computer may be switched to the monitoring policy of other transactional operation in a computer.

According to the embodiment described later, an information processing apparatus is able to determine whether the transactional operation in a computer has been completed.

A monitoring control program, monitoring control method, and monitoring control apparatus according to an embodiment of the present disclosure will be described below in detail with reference to the drawings.

(Example of Completion Determination of Transactional Operation in a Computer Using a Monitoring Control Program)

Figure 1:
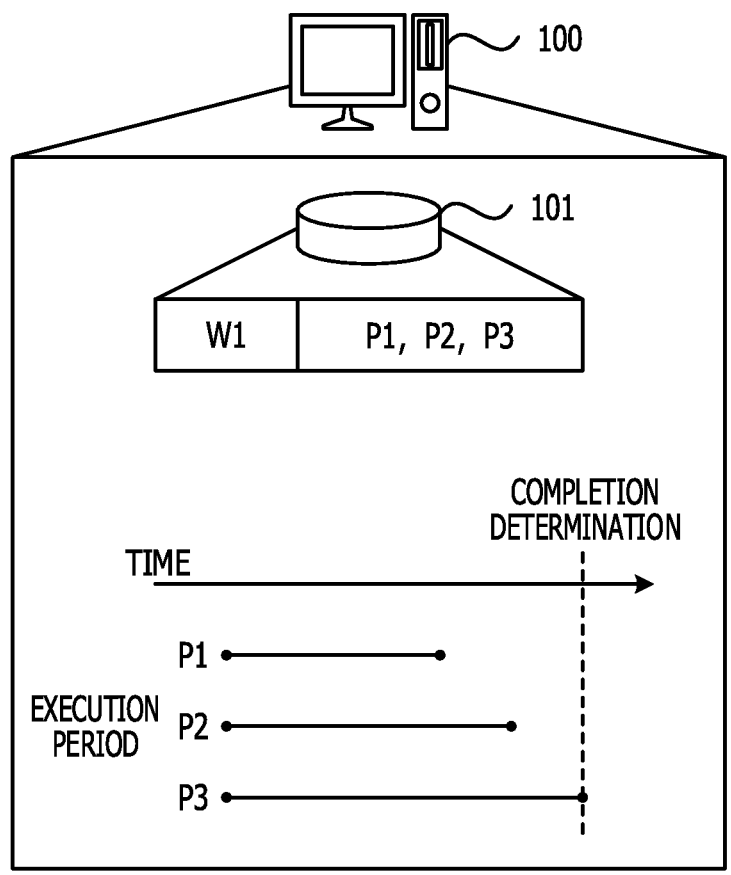
FIG. 1 depicts an example of completion determination of transactional operation in a computer by a monitoring control program according to an embodiment.

FIG. 1 depicts an example of completion determination of transactional operation in a computer using the monitoring control program according to the embodiment.

In FIG. 1, an information processing apparatus 100 is a computer that performs transactional operation in a computer W1. The information processing apparatus 100 also functions as a monitoring control apparatus that determines whether the transactional operation in a computer has been completed normally in the information processing apparatus 100 by executing the monitoring control program. The transactional operation in a computer is specific to particular business. The transactional operation in a computer is achieved by middleware, for example. The transactional operation in a computer is, for example, transactional operation in a computer for online business, transactional operation in a computer for batch processing, and so on.

The information processing apparatus 100 has a table 101 that stores information of a process that finishes executing upon completion of the transactional operation in a computer. The number of processes that finish executing upon completion of the transactional operation in a computer may be one or more than one. A process that finishes executing upon completion of the transactional operation in a computer is, for example, the above process for online business and created by middleware for online business. In the example in FIG. 1, the table 101 is assumed to store information of processes P1, P2, and P3 that finish executing upon completion of the transactional operation in a computer with the information associated with the transactional operation in a computer W1.

Specifically, the information processing apparatus 100 detects processes that finish executing in the information processing apparatus 100. The information processing apparatus 100 determines that the transactional operation in a computer W1 has been completed when the processes P1, P2, and P3, stored in the table 101, that are associated with the transactional operation in a computer W1 have finished executing, based on the detected result.

The information processing apparatus 100 may thereby determine whether the transactional operation in a computer W1 has been completed normally at a preset time of completion of the transactional operation in a computer W1. In addition, the information processing apparatus 100 is able to detect what time of completion the transactional operation in a computer W1 has been completed after the time of completion of the transactional operation in a computer W1.

If the transactional operation in a computer W1 has not been completed at the preset time of completion of the transactional operation in a computer W1, the information processing apparatus 100 may not change the monitoring policy for the transactional operation in a computer W1 in the information processing apparatus 100. Accordingly, the information processing apparatus 100 may continue to use the monitoring policy for the transactional operation in a computer W1 until the transactional operation in a computer W1 is completed. If the information processing apparatus 100 determines that the transactional operation in a computer W1 has been completed, the information processing apparatus 100 is able to change the monitoring policy for the transactional operation in a computer W1 to the monitoring policy for other transactional operation in a computer.

Although the case in which the information processing apparatus 100 that performs the transactional operation in a computer W1 functions as a monitoring control apparatus is described above, the present disclosure is not limited to this case. For example, another information processing apparatus 100 that manages the information processing apparatus 100 that performs the transactional operation in a computer W1 may function as a monitoring control apparatus that determines whether the transactional operation in a computer W1 in the information processing apparatus 100 is completed normally. In the following description, another information processing apparatus 100 that manages the information processing apparatus 100 may be referred to as a management apparatus.

In this case, the management apparatus has the table 101 described above. Next, the management apparatus receives information of a process that has finished executing in the information processing apparatus 100 that performs the transactional operation in a computer W1 from the information processing apparatus 100 that performs the transactional operation in a computer W1 and detects the process that has finished executing in the information processing apparatus 100 that performs the transactional operation in a computer W1. Then, the management apparatus determines whether the transactional operation in a computer W1 has been completed normally in the information processing apparatus 100 that performs the transactional operation in a computer W1 based on the detected result and the information stored in the table 101.

Although the information processing apparatus 100 determines whether one piece of transactional operation in a computer has been completed here, the present disclosure is not limited to this example. For example, the information processing apparatus 100 may have the tables 101 corresponding to multiple pieces of transactional operation in a computer and may determine whether each of the multiple pieces of transactional operation in a computer has been completed. If there is other transactional operation in a computer in conjunction with the transactional operation in a computer, the information processing apparatus 100 may determine that the transactional operation in a computer has been completed by detecting that the process that finishes executing upon completion of the other transactional operation in a computer in conjunction with the transactional operation in a computer has been actually completed.

(Example of the System Structure)

Figure 2:
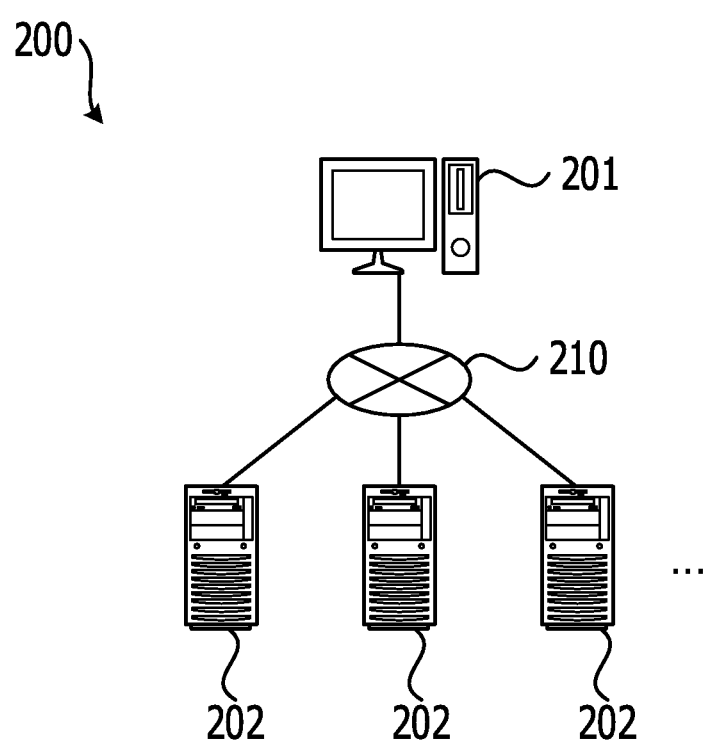
FIG. 2 depicts an example of the system structure of a monitoring system.

FIG. 2 depicts an example of the system structure of a monitoring system 200. In FIG. 2, a management apparatus 201 and information processing apparatuses 202 may be communicated with each other via a network 210. The network 210 is, for example, a local area network (LAN), a wide area network (WAN), the Internet, a mobile phone network, or the like.

The management apparatus 201 is achieved by a computer described later in FIG. 3. The management apparatus 201 is, for example, a server, notebook computer, desktop personal computer, or the like. The management apparatus 201 may function as a monitoring control apparatus and may determine whether the transactional operation in a computer has been completed normally in the information processing apparatus 202.

The information processing apparatus 202 is achieved by the computer described later in FIG. 3. The information processing apparatus 202 is a server, for example. The information processing apparatus 202 may function as a monitoring control apparatus and may determine whether the transactional operation in a computer has been completed normally in the information processing apparatus 202.

(Example of the Hardware Structure of the Computer)

Figure 3:
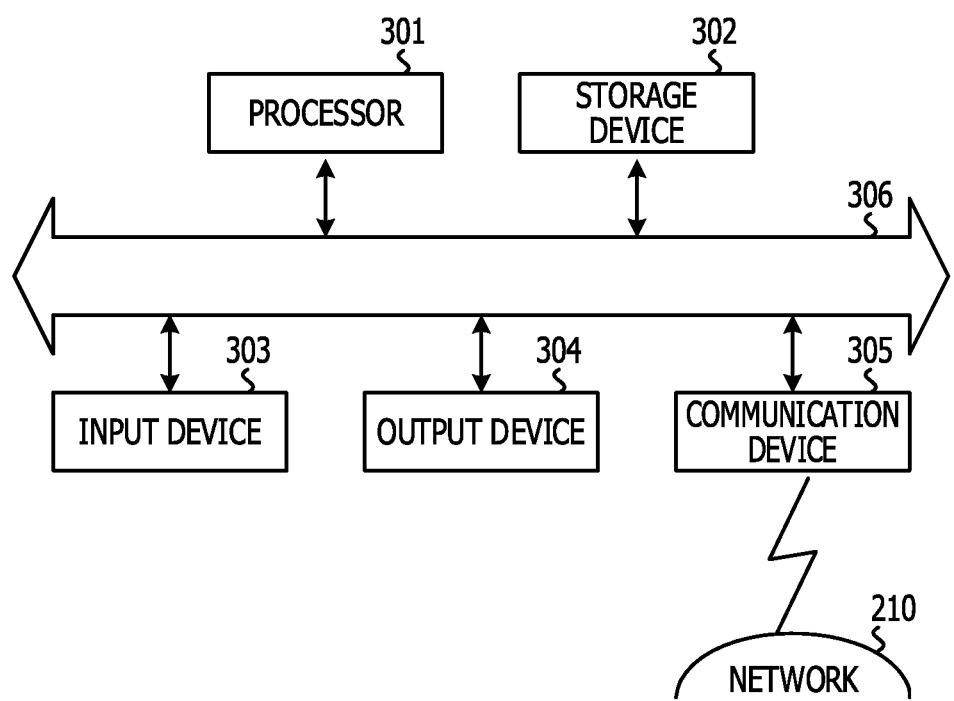
FIG. 3 is a block diagram depicting an example of the hardware structure of a computer.

FIG. 3 is a block diagram depicting an example of the hardware structure of the computer.

In FIG. 3, the computer includes a processor 301, a storage device 302, an input device 303, an output device 304, a communication device 305, which are connected to a bus 306.

The processor 301 controls the entire computer. In addition, the processor 301 executes an operating system (OS) stored in the storage device 302 and various programs such as the monitoring control program according to the present embodiment, so as to read data from the storage device 302 or writes data resulting from the execution to the storage device 302.

The storage device 302 includes a read only memory (ROM), random access memory (RAM), flash memory, magnetic disk drive, and so on. The storage device 302 is used as a work area for the processor 301 or stores various programs and various types of data including data obtained by executing various programs.

The input device 303 is an interface through which various types of data is input by user operations using a keyboard, mouse, touch panel, or the like. The output device 304 is an interface that outputs data according to an instruction from the processor 301. The output device 304 may be a display or printer. The communication device 305 is an interface that receives data externally or transmits data externally via a network. The computer may further include an optical disk drive, optical disk, scanner, and so on.

The management apparatus 201 is achieved by the computer in FIG. 3, for example. The information processing apparatus 202 is achieved by the computer in FIG. 3, for example.

(Example of the Functional Structure of a Monitoring Control Apparatus 400)

Next, an example of the functional structure of the monitoring control apparatus 400 will be described with reference to FIG. 4. The monitoring control apparatus 400 is achieved by the management apparatus 201 or the information processing apparatus 202.

Figure 4:
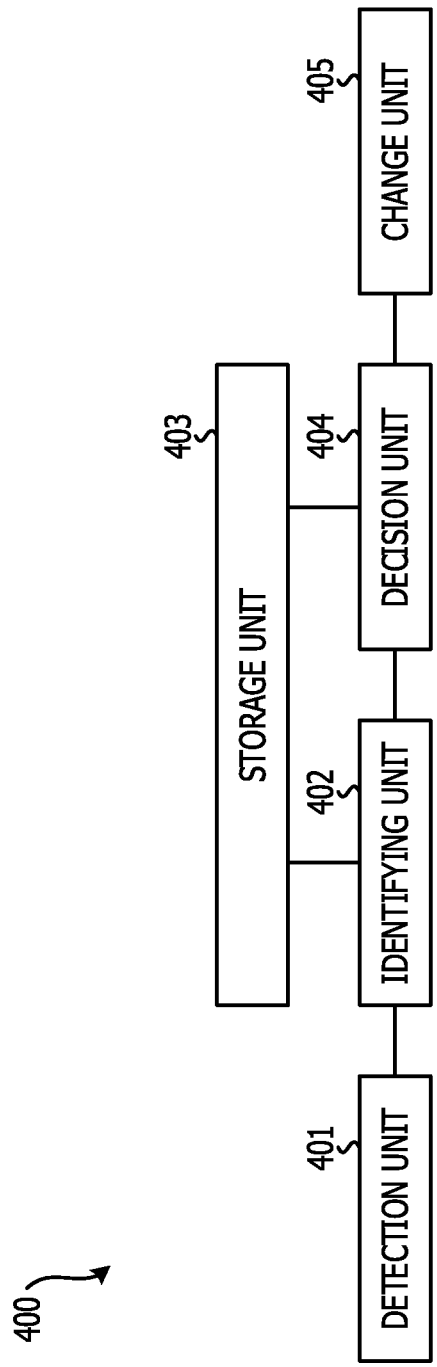
FIG. 4 is a block diagram depicting an example of the functional structure of a monitoring control apparatus.

FIG. 4 is a block diagram depicting an example of the functional structure of the monitoring control apparatus 400. The monitoring control apparatus 400 includes a detection unit 401, identifying unit 402, storage unit 403, decision unit 404, and change unit 405.

The monitoring control apparatus 400 is able to perform an action that creates a table for determining whether the transactional operation in a computer has been completed. In the following description, the action that creates a table may be referred to as a first action.

The monitoring control apparatus 400 is able to perform an action that determines whether the transactional operation in a computer has been completed in the information processing apparatus 202 based on the table. In the following description, the action that determines whether the transactional operation in a computer has been completed may be referred to as a second action.

If the information processing apparatus 202 determines that the transactional operation in a computer has been completed, the monitoring control apparatus 400 is able to perform an action that changes a monitoring policy for the information processing apparatus 202. In the following description, the action that changes a monitoring policy may be referred to as a third action.

<First Action>

The first action will be first described. The first action creates a table and is achieved by the detection unit 401, the identifying unit 402, and the storage unit 403.

The detection unit 401 detects termination of execution of a process in the information processing apparatus 202. In an example in which, for example, the monitoring control apparatus 400 is the information processing apparatus 202 itself, the detection unit 401 monitors a process executing in the information processing apparatus 202 and detects termination of the process. In an example in which, for example, the monitoring control apparatus 400 is the management apparatus 201 different from the information processing apparatus 202, the detection unit 401 receives the result monitoring of a process executing in the information processing apparatus 202 from the information processing apparatus 202 and detects termination of execution of the process.

The detection unit 401 achieves the function by causing the processor 301 to execute, for example, a program stored in the storage device 302 depicted in FIG. 3 or by using the communication device 305. The detected data is stored in the storage device 302, for example.

The identifying unit 402 identifies the first processes among the processes with a calling relationship that have finished executing in the information processing apparatus 202 in a planned completion period of the transactional operation in a computer based on the detected result. For example, the identifying unit 402 identifies the first processes of the processes with a calling relationship that have finished executing in common in the information processing apparatus 202 in a plurality of periods in which the transactional operation in a computer is planned to be completed based on the detected result.

Specifically, the identifying unit 402 identifies a plurality of periods "18:45 to 19:15 on Monday, Tuesday, and Wednesday" in which the transactional operation in a computer is planned to be completed based on a business schedule. Next, the identifying unit 402 identifies the processes "p0, p1, p2, p3, and p5" that have finished executing at "18:45 to 19:15 on Monday". In addition, the identifying unit 402 identifies the processes "p0, p1, p2, and p3" that have finished executing at "18:45 to 19:15 on Tuesday". In addition, the identifying unit 402 identifies the processes "p0, p1, p2, and p3" that have finished executing at "18:45 to 19:15 on Wednesday".

Next, the identifying unit 402 identifies the processes "p0, p1, p2, and p3" that have finished executing in common at "18:45 to 19:15 on Monday, Tuesday, and Wednesday". Then, the identifying unit 402 identifies the processes with a calling relationship "p0, p1, p2, and p3" of the processes "p0, p1, p2, and p3".

The identifying unit 402 may thereby identify the processes with a calling relationship that have finished executing in a planned completion period of the transactional operation in a computer, excluding the process that has finished executing accidentally in any of a plurality of periods. For example, the identifying unit 402 is able to identify the process "p0, p1, p2, and p3" that have finished executing in a planned completion period of the transactional operation in a computer, excluding the process "p5" that has finished executing at "18:45 to 19:15 on Monday" accidentally.

Based on the detected result, the identifying unit 402 identifies the second processes that are the calling processes of the processes called repeatedly in the information processing apparatus 202. The identifying unit 402 counts the number of times processes are called within a predetermined time, identifies the processes called a plurality of times, and identifies the second processes that are the calling processes of the identified processes.

Specifically, the identifying unit 402 identifies the process "p3" that has been generated and called a plurality of times within one hour. Next, the identifying unit 402 identifies the parent process "p2" that has called the identified process "p3", identifies the parent process "p1" that has called the parent process "p2", and identifies the parent process "p0" that has called the parent process "p1". Then, the identifying unit 402 identifies the processes "p0, p1, and p2" that are the calling processes of the process "p3".

Specifically, the identifying unit 402 identifies the process "p4" that has been generated and called a plurality of times within one hour. Next, the identifying unit 402 identifies the parent process "p2" that has called the identified process "p4", identifies the parent process "p1" that has called the parent process "p2", and identifies the parent process "p0" that has called the parent process "p1". Then, the identifying unit 402 identifies the processes "p0, p1, and p2" that are the calling processes of the process "p4".

If there is duplication between the plurality of identified processes, the identifying unit 402 collectively identifies the plurality of processes as new processes. Since there is duplication between the processes "p0, p1, and p2" that are the calling process of the process "p3" and the processes "p0, p1, and p2" that are the calling processes of the process "p4", the identifying unit 402 collectively identifies these processes as the processes "p0, p1, and p2". The identifying unit 402 may thereby identify the processes with a calling relationship resident in the information processing apparatus 202 when the transactional operation in a computer is performed in the information processing apparatus 202.

The identifying unit 402 stores, in the storage unit 403, information of the process common to the identified first processes and the identified second processes with the information associated with the transactional operation in a computer. Specifically, the identifying unit 402 stores, in the storage unit 403, the processes "p0, p1, and p2" common to the identified processes "p0, p1, p2, and p3" and the identified processes "p0, p1, and p2" with these processes associated with the transactional operation in a computer.

The identifying unit 402 may store, in the storage unit 403, information of a series of processes that have finished executing in a common defined order in a plurality of periods among the processes common to the identified first processes and the identified second processes with the information associated with the transactional operation in a computer. Specifically, the identifying unit 402 identifies the processes that have finished executing in the defined order "p1 and then p0" at "18:45 to 19:15 on Monday, Tuesday, and Wednesday" among the processes "p0, p1, p2, and p3".

Next, the identifying unit 402 identifies the processes "p0, p1, and p2" common to the identified processes "p0, p1, p2, and p3" and the identified processes "p0, p1, and p2" in association with the transactional operation in a computer. Then, the identifying unit 402 stores, in the storage unit 403, a series of processes "p0 and p1" that finish executing in a defined order among the common processes "p0, p1, and p2" with the series of processes associated with the transactional operation in a computer. The identifying unit 402 may thereby identify the processes that finish executing upon completion of the transactional operation in a computer and identify a series of processes that finish executing in a defined order among processes.

The identifying unit 402 may identify the third processes that finish executing during shutdown of the information processing apparatus 202, based on the detected result. Specifically, the identifying unit 402 identifies the first processes with a calling relationship that finish executing in common in a plurality of periods in which the transactional operation in a computer is completed during shutdown. Next, the identifying unit 402 identifies the duplicate processes between the first processes and the second processes and identifies the third processes, excluding the duplicate processes, which finish executing during shutdown of the information processing apparatus 202. Then, the identifying unit 402 stores the third processes associated with the transactional operation in a computer in the storage unit 403. The identifying unit 402 may thereby identify the processes that finish executing upon completion of the transactional operation in a computer, identify a series of processes that finish executing in a defined order among the processes, and identify the process that finishes executing during shutdown.

The identifying unit 402 achieves the function by, for example, causing the processor 301 to execute a program stored in the storage device 302 depicted in FIG. 3.

The storage unit 403 stores the completion pattern of processes that represents the completion of the transactional operation in a computer with the pattern associated with the transactional operation in a computer. The completion pattern represents the combination, completion order, and so on of a plurality of processes that finish executing upon completion of the transactional operation in a computer. In the following description, the completion pattern may be simply referred to as the pattern.

The storage unit 403 stores, for example, a plurality of processes that finish executing upon, for example, completion of the transactional operation in a computer. Specifically, the storage unit 403 stores the processes "p0, p1, and p2" identified by the identifying unit 402 in a table. In the following description, the table that stores a plurality of processes that finish executing upon completion of the transactional operation in a computer may be referred to as a combination table. The pattern is stored in the combination table, for example. The decision unit 404 may thereby determine whether the transactional operation in a computer has been completed with reference to information stored in the combination table.

The storage unit 403 may store, for example, information of a series of processes that finish executing in a defined order upon completion of the transactional operation in a computer among a plurality of processes that finish executing upon completion of the transactional operation in a computer with the information associated with the transactional operation in a computer. Specifically, the storage unit 403 stores a series of processes "p0 and p1" in the defined order "p1 and then P0" among the processes "p0, p1, and p2" identified by the identifying unit 402. In the following description, the table that stores a series of processes in the defined order among a plurality of processes that finish executing upon completion of the transactional operation in a computer may be referred to as an order table. In addition, the storage unit 403 stores the remaining process "p2" in the combination table. The pattern is stored in the combination table and the order table, for example. The decision unit 404 may thereby determine whether the transactional operation in a computer has been completed with reference to information stored in the combination table and the order table.

The storage unit 403 may further store information of the process that finishes executing during shutdown of the information processing apparatus 202. Specifically, the storage unit 403 stores the process "p6", detected by the detection unit 401, which finishes executing during shutdown of the information processing apparatus 202 in the table. In the following description, the table that stores the process that finishes executing during shutdown may be referred to as a supplementary table. The decision unit 404 may thereby determine whether a shutdown has been performed with reference to information stored in the supplementary table.

The information of the process may include the information of the process that finishes executing upon completion of other transactional operation in a computer that is completed in conjunction with the transactional operation in a computer. The decision unit 404 may thereby identify the process that finishes executing upon completion of the transactional operation in a computer in detail and improve the accuracy of determining whether the transactional operation in a computer has been completed.

The information of the processes may be the information of a process that has finished executing in another information processing apparatus 202 different from the information processing apparatus 202 upon completion of the transactional operation in a computer in the other information processing apparatus 202 or during shutdown of the other information processing apparatus 202.

The case in which the information of the process that finishes executing in the information processing apparatus 202 upon completion of the transactional operation in a computer in the information processing apparatus 202 is not identified is taken as an example. Even in this case, the monitoring control apparatus 400 is able to determine whether the transactional operation in a computer has been completed in the information processing apparatus 202 using information of a process that finishes executing in another information processing apparatus 202 upon completion of the transactional operation in a computer in the other information processing apparatus 202.

The following case is taken as an example, in which the type of a process that finishes executing upon completion of the transactional operation in a computer changes as the content of the transactional operation in a computer changes and in which the information of a process that finishes executing in the information processing apparatus 202 upon completion of the transactional operation in a computer in the information processing apparatus 202 is not identified. Even in this case, the monitoring control apparatus 400 is able to determine whether the transactional operation in a computer has been completed in the information processing apparatus 202 using information of a process that finishes executing upon completion of the transactional operation in a computer in another information processing apparatus 202.

In addition, the case in which the information processing apparatus 202 is newly added to the network 210 is taken as an example. Even in this case, the monitoring control apparatus 400 is able to determine whether the transactional operation in a computer has been completed in the information processing apparatus 202 that has been newly added, using information of a process that finishes executing upon completion of the transactional operation in a computer in another information processing apparatus 202. The storage unit 403 achieves the function using the storage device 302 depicted in FIG. 3, for example.

<Second Action>

Next, the second action will be described. The second action determines whether the transactional operation in a computer has been completed and is achieved by the detection unit 401, the storage unit 403, and the decision unit 404.

Since the detection unit 401 performs processing similar to that in the first action, descriptions are omitted. The storage unit 403 stores the order table and the combination table created in the first action. The storage unit 403 may store the supplementary table.

The decision unit 404 determines whether the transactional operation in a computer has been completed with reference to information stored in the storage unit 403, which stores information of a process that finishes executing upon completion of the transactional operation in a computer with the information associated with the transactional operation in a computer, based on the detected result.

For example, the decision unit 404 determines whether the transactional operation in a computer has been completed depending on whether the completion result of the detected process matches the completion pattern of the processes that represents the completion of the transactional operation in a computer, stored in the storage unit 403, that is associated with the completion pattern associated with the transactional operation in a computer.

Here, the case in which the processes "p0, p1, and p2" are stored in the combination table is taken as an example. In this case, the decision unit 404 determines whether the processes "p0, p1, and p2" stored in the combination table have finished executing based on the detected result.

Then, if the decision unit 404 determines that the processes have finished executing, it determines that the transactional operation in a computer has been completed normally. In contrast, if the decision unit 404 determines that the processes have not finished executing, it determines that the transactional operation in a computer has not been completed normally. The decision unit 404 may thereby determine whether the transactional operation in a computer has been completed with reference to information stored in the combination table.

The decision unit 404 may determine that the transactional operation in a computer has been completed with reference to information stored in the storage unit 403 based on the detected result. The decision unit 404 determines that the transactional operation in a computer has been completed if a series of processes have finished executing in the defined order and the remaining processes different from the series of processes of a plurality of processes have finished executing.

The case in which a series of processes "p0 and p1" are stored in the order table and the remaining process "p2" is stored in the combination table is taken as an example. In this case, the decision unit 404 determines whether the series of processes "p0 and p1" have finished executing in the defined order "p1 and then p0". In addition, the decision unit 404 determines whether the remaining process "p2" has finished executing.

If the decision unit 404 determines that the series of processes have finished executing in the defined order and the remaining process has finished executing, it determines that the transactional operation in a computer has been completed normally. In contrast, if the series of processes have not finished executing in the defined order or the remaining process has not finished executing, the decision unit 404 determines that the transactional operation in a computer has not been completed normally. The decision unit 404 may thereby determine whether the transactional operation in a computer has been completed with reference to information stored in the order table and combination table.

The decision unit 404 may determine that the transactional operation in a computer has been completed during shutdown of the information processing apparatus 202 with reference to information stored in the storage unit 403, based on the detected result. The decision unit 404 determines that the series of processes have finished executing in the defined order, the remaining process different from the series of processes of the plurality of processes have finished executing, and the process that finishes executing during shutdown has finished executing. In this case, the decision unit 404 determines that the transactional operation in a computer has been completed during shutdown of the information processing apparatus 202.

The case in which a series of processes "p0 and p1" are stored in the order table, the remaining process "p2" is stored in the combination table, and the process "p6" that finishes executing during shutdown is stored in the supplementary table is taken as an example. In this case, the decision unit 404 determines whether the series of processes "p0 and p1" have finished executing in the defined order "p1 and then p0". In addition, the decision unit 404 determines whether the remaining process "p2" has finished executing. The decision unit 404 also determines whether the process "p6" that finishes executing during shutdown has finished executing.

If the decision unit 404 determines that the series of processes have finished executing in the defined order, the remaining process has finished executing, and the process that finishes executing during shutdown has finished executing, then the decision unit 404 determines that the transactional operation in a computer has been completed during shutdown of the information processing apparatus 202. The decision unit 404 may thereby determine whether the transactional operation in a computer has been completed during shutdown with reference to information stored in the order table, the combination table, and the supplementary table.

The decision unit 404 achieves the function by, for example, causing the processor 301 to execute a program stored in the storage device 302 depicted in FIG. 3. The determination result is stored in the storage device 302, for example.

<Third Action>

Next, the third action will be described. The third action changes a monitoring policy and is achieved by the storage unit 403 and the change unit 405.

The change unit 405 changes a monitoring policy when the decision unit 404 determines that the transactional operation in a computer has been completed. For example, the change unit 405 changes a monitoring policy for determining whether the transactional operation in a computer operates normally in the information processing apparatus 202 to a monitoring policy for determining whether other transactional operation in a computer different from the transactional operation in a computer operates normally.

The change unit 405 may turn off the monitoring policy when the decision unit 404 determines that the transactional operation in a computer has been completed during shutdown of the information processing apparatus 202. When the information processing apparatus 202 starts up, the change unit 405 restores the original monitoring policy.

The change unit 405 thereby enables the transactional operation in a computer to be monitored using an appropriate monitoring policy. The change unit 405 achieves the function by causing the processor 301 to execute a program stored in the storage device 302 depicted in FIG. 3 or by using the communication device 305, for example.

If the information processing apparatus 202 functions as the monitoring control apparatus 400, the information processing apparatus 202 may have only the function about the first action, only the function about the second action, or only the function about the third action. If the information processing apparatus 202 functions as the monitoring control apparatus 400, the information processing apparatus 202 may have only the function about two actions of the first action, the second action, and the third action or the function about these three actions.

If the management apparatus functions as the monitoring control apparatus 400, the information processing apparatus 202 may have only the function about the first action, only the function about the second action, or only the function about the third action. If the management apparatus functions as the monitoring control apparatus 400, the information processing apparatus 202 may have only the function about two actions of the first action, the second action, and the third action or the function about these three actions.

(Identifying the Processes with a Parent-Child Relationship)

Figure 5:
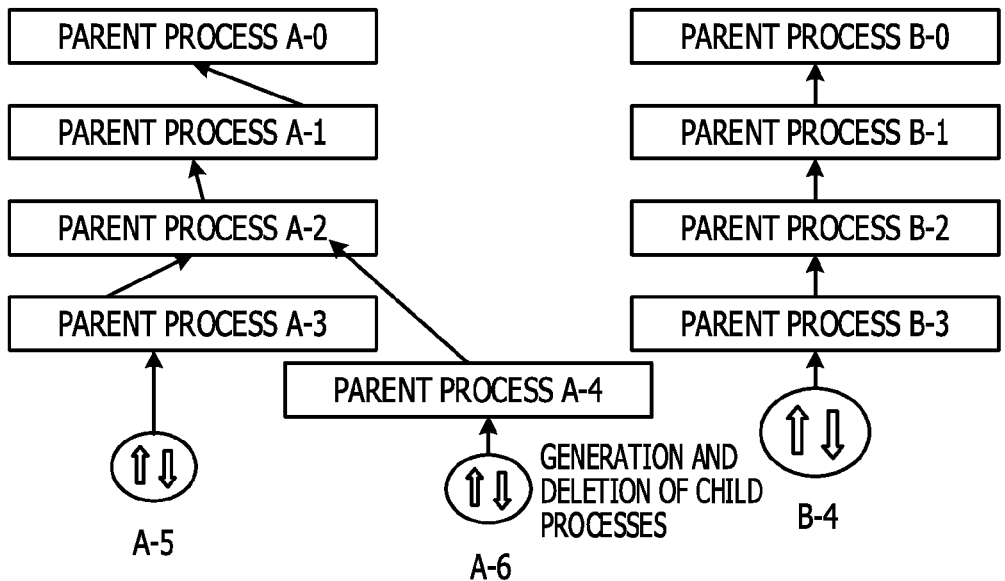
FIG. 5 depicts an example of identifying the processes with a parent-child relationship.

Next, an example of identifying the processes with a parent-child relationship by the information processing apparatus 202 will be described with reference to FIG. 5. FIG. 5 depicts an example in which the information processing apparatus 202 functions as the monitoring control apparatus 400. Specifically, in the example in FIG. 5, the identifying unit 402 described with reference to FIG. 4 identifies the second processes.

FIG. 5 depicts an example of identifying the processes with a parent-child relationship. The information processing apparatus 202 detects the child processes generated and deleted repeatedly by parent processes in a predetermined period. Next, the information processing apparatus 202 identifies the parent processes that are present on the parent side of the detected child processes. Then, the information processing apparatus 202 stores the identified parent processes in the storage device 302 as resident processes with a parent-child relationship by excluding the child processes generated and deleted repeatedly. If there are a plurality of duplicate parent processes in the identified parent processes, the plurality of duplicate parent processes are collectively stored in the storage device 302 as resident processes with a parent-child relationship.

In the example in FIG. 5, the information processing apparatus 202 detects the child processes A-5, A-6, and B-4 generated repeatedly in a predetermined period. Next, the information processing apparatus 202 identifies the parent processes A-0 to A-3 that are present on the parent side of the child process A-5. The information processing apparatus 202 also identifies the parent processes A-0 to A-2 and A-4 that are present on the parent side of the child process A-6. The information processing apparatus 202 also identifies the parent processes B-0 to B-3 that are present on the parent side of the child process B-4.

Then, since there is duplication between the identified parent processes A-0 to A-3 and the identified parent processes A-0 to A-2 and A-4, the information processing apparatus 202 collectively stores these parent processes in the storage device 302 as resident processes A-0 to A-4 with a parent-child relationship. In addition, the information processing apparatus 202 stores the identified parent processes B-0 to B-3 in the storage device 302 as resident processes B-0 to B-3 with a parent-child relationship.

If the management apparatus functions as the monitoring control apparatus 400, the management apparatus may identify the processes with a parent-child relationship in the information processing apparatus 202 by receiving, from the information processing apparatus 202, the history of generation and deletion of processes in the information processing apparatus 202.

(Identifying the Processes that have Finished Executing in a Planned Completion Period of the Transactional Operation in a Computer)

Figure 6:
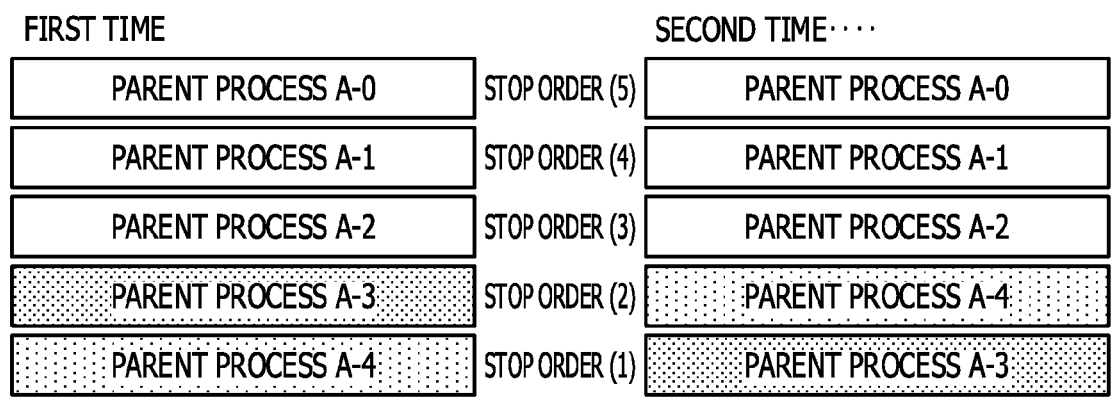
FIG. 6 depicts an example of identifying the processes that finish executing in a planned completion period of transactional operation in a computer.

Next, an example of identifying the processes that finish executing in a planned completion period of the transactional operation in a computer by the information processing apparatus 202 will be described with reference to FIG. 6. FIG. 6 depicts an example in which the information processing apparatus 202 functions as the monitoring control apparatus 400. Specifically, in the example in FIG. 6, the identifying unit 402 described with reference to FIG. 4 identifies the first processes.

FIG. 6 depicts an example of identifying the processes that finish executing in the planned completion period of the transactional operation in a computer. The information processing apparatus 202 identifies the processes that have finished executing and the order in which the processes have finished executing in a plurality of planned completion periods of the transactional operation in a computer, and stores the identified processes and order associated with the transactional operation in a computer in the storage device 302.

In the example in FIG. 6, the information processing apparatus 202 identifies the plurality of planned completion periods of the transactional operation in a computer based on monitoring policy definition information. Monitoring policy definition information represents the schedule of the transactional operation in a computer. Monitoring policy definition information includes information of the planned completion time of the transactional operation in a computer, for example.

The information processing apparatus 202 identifies, for example, the period of 30 minutes from 15 minutes before the planned completion time as the planned completion period. It is assumed that the information processing apparatus 202 identifies two planned completion periods.

Next, the information processing apparatus 202 identifies the parent processes A-0 to A-4 that have finished executing in the first planned completion period of the transactional operation in a computer. Then, the information processing apparatus 202 identifies the order of A-4, A-3, A-2, A-1, and then A-0 in which the parent processes A-0 to A-4 have finished executing.

In addition, the information processing apparatus 202 identifies the parent processes A-0 to A-4 that have finished executing in the second planned completion period of the transactional operation in a computer. Then, the information processing apparatus 202 identifies the order of A-3, A-4, A-2, A-1, and then A-0 in which these parent processes A-0 to A-4 have finished executing.

The information processing apparatus 202 may thereby identify the processes that finish executing in the planned completion periods of the transactional operation in a computer. That is, the information processing apparatus 202 is able to identify the process group including the process that finishes executing upon completion of the transactional operation in a computer.

The case in which the management apparatus functions as the monitoring control apparatus 400 is taken as an example. In this case, the management apparatus may identify the process group including process that finishes executing upon completion of the transactional operation in a computer in the information processing apparatus 202 by receiving the history of execution and completion of processes in the information processing apparatus 202 from the information processing apparatus 202.

(Identifying the Processes in a Planned Shutdown Period)

Next, an example of identifying the processes that finish executing in a planned shutdown period by the information processing apparatus 202 will be described with reference to FIG. 7. FIG. 7 depicts an example in which the information processing apparatus 202 functions as the monitoring control apparatus 400. Specifically, in the example in FIG. 7, the identifying unit 402 described with reference to FIG. 4 identifies the third processes.

FIG. 7 depicts an example of identifying the processes that finish executing in a planned shutdown period. The information processing apparatus 202 identifies the processes that have finished executing and the order in which the processes have finished executing in a plurality of planned shutdown periods, and stores the identified processes and order associated with the transactional operation in a computer during shutdown in the storage device 302.

In the example in FIG. 7, the information processing apparatus 202 identifies the plurality of planned shutdown periods based on monitoring policy definition information. The information processing apparatus 202 identifies, for example, the period of 30 minutes from 15 minutes before the planned shutdown time as the planned shutdown period. It is assumed that the information processing apparatus 202 has identified the two planned shutdown periods.

Next, the information processing apparatus 202 identifies, in the first planned shutdown period, the parent processes A-0 to A-4 that have finished executing and the processes X-0 to X-4 that have finished executing. In addition, the information processing apparatus 202 identifies the order of A-4, A-3, A-2, A-1, and then A-0 in which these parent processes A-0 to A-4 have finished executing.

In addition, the information processing apparatus 202 identifies, in the second planned shutdown period, the parent processes A-0 to A-4 that have finished executing and the processes X-0 to X-4 that have finished executing. In addition, the information processing apparatus 202 identifies the order of A-3, A-4, A-2, A-1, and then A-0 in which these parent processes A-0 to A-4 have finished executing.

The information processing apparatus 202 may thereby identify the processes that finish executing in the planned shutdown period. That is, the information processing apparatus 202 is able to identify the process group including process that finishes executing during shutdown.

The case in which the management apparatus functions as the monitoring control apparatus 400 is taken as an example. In this case, the management apparatus may identify the process group including process that finishes executing during shutdown in the information processing apparatus 202 by receiving the history of execution and completion of processes in the information processing apparatus 202 from the information processing apparatus 202.

(Tables for Transactional Operation in a Computer)

Next, examples of tables for transactional operation in a computer that store the processes that finish executing upon completion of the transactional operation in a computer of the information processing apparatus 202 will be described with reference to FIG. 8.

Figure 8:
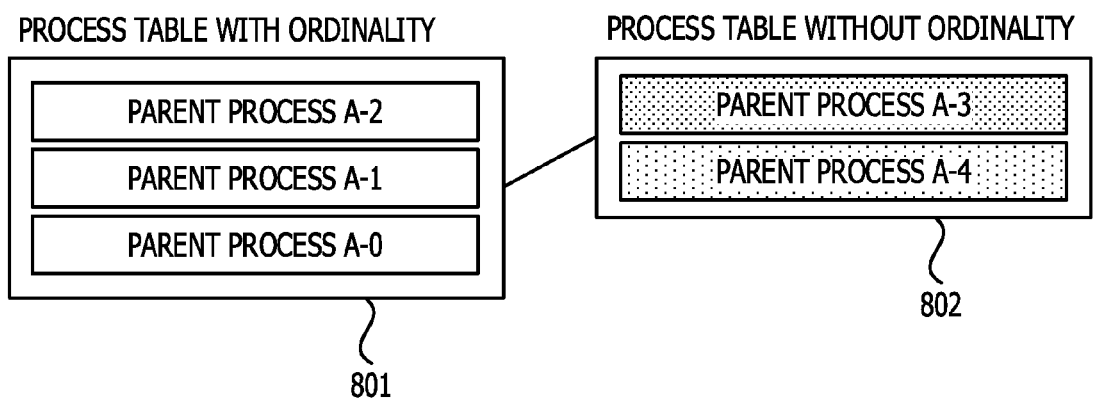
FIG. 8 depicts examples of tables for transactional operation in a computer.

FIG. 8 depicts an example in which the information processing apparatus 202 functions as the monitoring control apparatus 400. Specifically, in the example in FIG. 8, the identifying unit 402 described with reference to FIG. 4 identifies the processes common to the first processes and the second processes and stores the identified processes as an order table 801 and a combination table 802.

FIG. 8 depicts examples of tables for transactional operation in a computer. The information processing apparatus 202 creates an order table 801 for processes with ordinality that stores information of a series of processes that finish executing in a predetermined order of the processes stored in the storage device 302 in FIG. 6, and stores the created order table 801 in the storage device 302. In the example in FIG. 8, the order table 801 stores the processes A-0 to A-2 of the processes stored in the storage device 302 in FIG. 6 as processes with ordinality.

In addition, the information processing apparatus 202 creates a combination table 802 for processes without ordinality that stores information of the remaining processes excluding the series of processes that finish executing in the predetermined order of the identified processes and stores the created combination table 802 in the storage device 302. In the example in FIG. 8, the combination table 802 stores the processes A-3 and A-4 of the processes stored in the storage device 302 in FIG. 6 as processes without ordinality.

Next, the information processing apparatus 202 excludes, from the order table 801, the processes stored in the order table 801 that are different from the resident processes A-0 to A-4 with a parent-child relationship stored in the storage device 302 in FIG. 5. In addition, the information processing apparatus 202 excludes, from the combination table 802, the processes stored in the combination table 802 that are different from the resident processes A-0 to A-4 with a parent-child relationship stored in the storage device 302 in FIG. 5.

The information processing apparatus 202 may thereby identify the processes that finish executing upon completion of the transactional operation in a computer. In addition, the information processing apparatus 202 may create various tables used to determine whether the transactional operation in a computer has been completed and store the created tables in the storage device 302.

If the management apparatus functions as the monitoring control apparatus 400, the management apparatus may create various tables by receiving, from the information processing apparatus 202, a process group including the process that finishes executing upon completion of the transactional operation in a computer, identified by the information processing apparatus 202.

(Creating Tables for Shutdown)

Next, examples of tables for shutdown that store the processes that finish executing during shutdown of the information processing apparatus 202 will be described with reference to FIG. 9.

Figure 9:
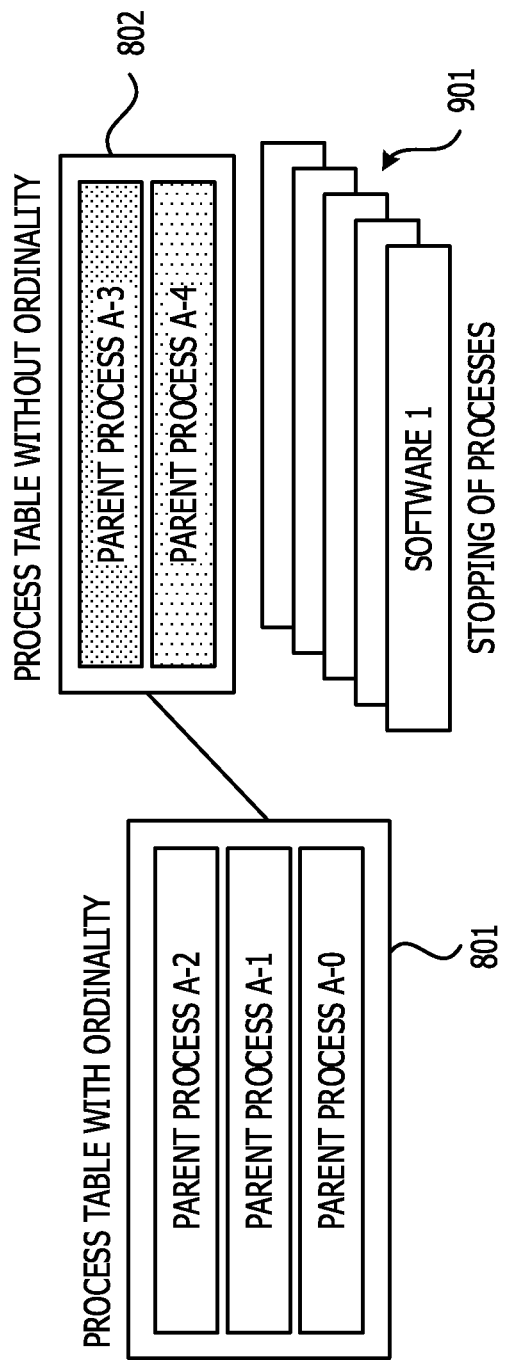
FIG. 9 depicts examples of tables for shutdown.

FIG. 9 is an example in which the information processing apparatus 202 functions as the monitoring control apparatus 400. Specifically, in the example in FIG. 9, the identifying unit 402 described with reference to FIG. 4 stores the order table 801 and the combination table 802 and identifies the third processes and stores the processes as a supplementary table 901.

FIG. 9 depicts examples of tables for shutdown. The information processing apparatus 202 creates an order table 801 for processes with ordinality that stores information of a series of processes that finish executing in a predetermined order of the processes stored in the storage device 302 in FIG. 6, and stores the created order table 801 in the storage device 302. In addition, the information processing apparatus 202 creates a combination table 802 for processes without ordinality that stores information of the remaining processes excluding the series of processes that finish executing in the predetermined order of the identified processes and stores the created combination table 802 in the storage device 302.

Next, the information processing apparatus 202 excludes, from the order table 801, the processes stored in the order table 801 that are different from the resident processes A-0 to A-4 with a parent-child relationship stored in the storage device 302 in FIG. 5. In addition, the information processing apparatus 202 excludes, from the combination table 802, the processes stored in the combination table 802 that are different from the resident processes A-0 to A-4 with a parent-child relationship stored in the storage device 302 in FIG. 5.

Next, the information processing apparatus 202 identifies the processes, stored in the storage device 302 in FIG. 6, that have been excluded from the combination table 802 as processes that finish executing upon completion of other processing different from the transactional operation in a computer. Then, the information processing apparatus 202 creates a supplementary table 901 for other processing that stores the identified processes, and stores the created supplementary table 901 in the storage device 302.

The information processing apparatus 202 may thereby identify the processes that finish executing during shutdown. Then, the information processing apparatus 202 may create various tables used to determine whether a shutdown has been performed, and store the created tables in the storage device 302.

If the management apparatus functions as the monitoring control apparatus 400, the management apparatus may create various tables by receiving, from the information processing apparatus 202, a process group including the process that finishes executing during shutdown, identified by the information processing apparatus 202.

(Example of Determining Whether the Transactional Operation in a Computer has been Completed)

Next, an example of determining whether the transactional operation in a computer has been completed based on the various tables created as depicted in FIG. 8 and the various tables created as depicted in FIG. 9 by the information processing apparatus 202 will be described with reference to FIG. 10.

Figure 10:
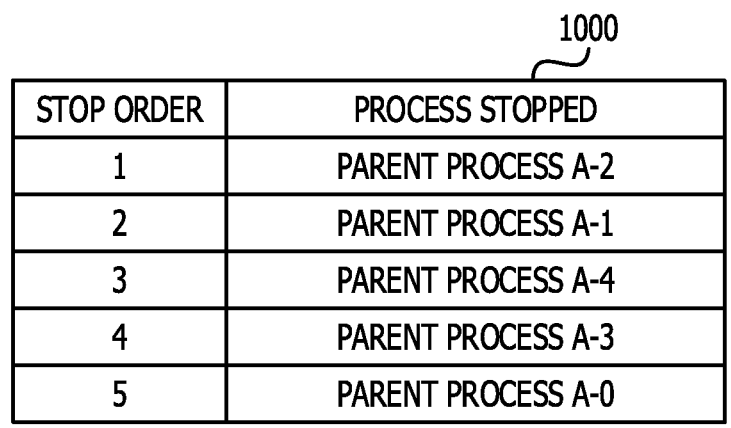
FIG. 10 depicts an example of determining whether transactional operation in a computer has been completed.

FIG. 10 depicts an example in which the information processing apparatus 202 functions as the monitoring control apparatus 400. Specifically, in the example in FIG. 10, the decision unit 404 described with reference to FIG. 4 determines whether the transactional operation in a computer has been completed in the information processing apparatus 202.

FIG. 10 depicts an example of determining whether the transactional operation in a computer has been completed. Upon detecting that a process has finished executing, the information processing apparatus 202 determines whether a process stored in any of the various tables created as depicted in FIG. 8 and the various tables created as depicted in FIG. 9 has finished executing.

Upon determining that a process has finished executing, the information processing apparatus 202 subsequently detects that a process has finished executing and creates history 1000 of the processes that have finished executing. In the example in FIG. 10, the information processing apparatus 202 creates the history 1000 that stores information of the processes A-0 to A-4 that have finished executing in the order of process A-2, process A-1, process A-4, process A-3, and then the process A-0.

Then, the information processing apparatus 202 determines whether the transactional operation in a computer has been completed normally from the created history 1000 based on the various tables created as depicted in FIG. 8. The information processing apparatus 202 determines whether the processes A-0 to A-2 have finished executing in a predetermined order based on, for example, the order table 801 created as depicted in FIG. 8. In the example in FIG. 10, the information processing apparatus 202 determines that execution has finished in the predetermined order.

In addition, the information processing apparatus 202 determines whether the remaining processes A-3 and A-4 have finished executing based on the combination table 802 created as depicted in FIG. 8. In the example in FIG. 10, the information processing apparatus 202 determines that execution has been finished. Then, the information processing apparatus 202 determines that the transactional operation in a computer has been completed normally because the series of processes have finished executing in the predetermined order and the remaining processes have finished executing.

In addition, the information processing apparatus 202 may also determine, from the history 1000, whether a shutdown has been performed based on the various tables created as depicted in FIG. 9. The information processing apparatus 202 determines whether the processes A-0 to A2 have finished executing in a predetermined order based on, for example, the order table 801 created as depicted in FIG. 9. Then, the information processing apparatus 202 determines whether the remaining processes A-3 and A-4 have finished executing based on the combination table 802 created as depicted in FIG. 9.

Then, the information processing apparatus 202 determines whether the processes X-0 to X-4 of other processing have finished executing based on the supplementary table 901 created as depicted in FIG. 9. If the series of processes have finished executing in a predetermined order, the remaining processes have finished executing, and the processes of other processing have finished executing, then the information processing apparatus 202 determines that the transactional operation in a computer has been completed normally during shutdown.

If the management apparatus functions as the monitoring control apparatus 400, the management apparatus may determine whether the transactional operation in a computer has been completed normally by receiving, from the information processing apparatus 202, information of the process that has finished executing in the information processing apparatus 202.

(Another Example of Determines Whether the Transactional Operation in a Computer has been Completed)

Next, another example of determining whether the transactional operation in a computer has been completed based on the tables created as depicted in FIG. 8 and the tables created as depicted in FIG. 9 by the information processing apparatus 202 will be described with reference to FIG. 11.

Figure 11:
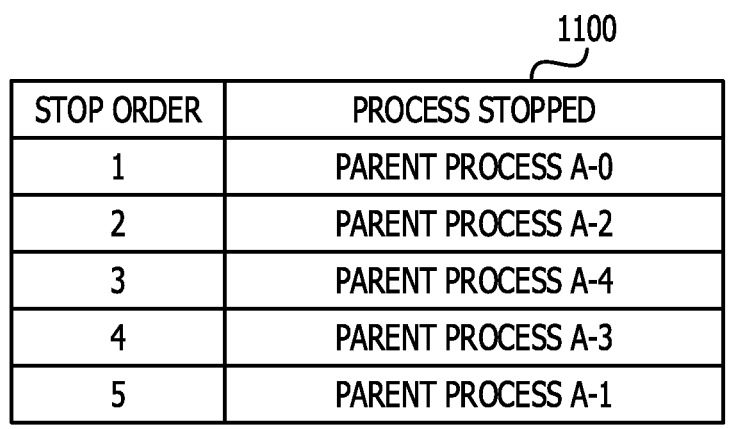
FIG. 11 depicts another example of determining whether transactional operation in a computer has been completed.

FIG. 11 depicts an example in which the information processing apparatus 202 functions as the monitoring control apparatus 400. Specifically, in the example in FIG. 11, the decision unit 404 described with reference to FIG. 4 determines whether the transactional operation in a computer has been completed in the information processing apparatus 202.

FIG. 11 depicts another example of determining whether the transactional operation in a computer has been completed. Upon detecting that a process has finished executing, the information processing apparatus 202 determines whether a process stored in any of the various tables created as depicted in FIG. 8 and the various tables created as depicted in FIG. 9 has finished executing.

Upon determining that a process has finished executing, the information processing apparatus 202 subsequently detects that a process has finished executing and creates history 1100 of the processes that have finished executing. In the example in FIG. 11, the information processing apparatus 202 creates the history 1100 that stores information of the processes A-0 to A-4 that have finished executing in the order of process A-0, process A-2, process A-4, process A-3, and then the process A-1.

Then, the information processing apparatus 202 determines whether the transactional operation in a computer has been completed normally from the created history 1100 based on the various tables created as depicted in FIG. 8. The information processing apparatus 202 determines whether the processes A-0 to A-2 have finished executing in a predetermined order based on, for example, the order table 801 created as depicted in FIG. 8. In the example in FIG. 11, the information processing apparatus 202 determines that execution has finished in an order different from the predetermined order.

In addition, the information processing apparatus 202 determines whether the remaining processes A-3 and A-4 have finished executing based on the combination table 802 created as depicted in FIG. 8. In the example in FIG. 11, the information processing apparatus 202 determines that execution has been finished. Then, the information processing apparatus 202 determines that the transactional operation in a computer has not been completed normally because the series of processes have finished executing in an order different from the predetermined order.

(Switching the Monitoring Policy Upon Completion of the Transactional Operation in a Computer)

Figure 12:
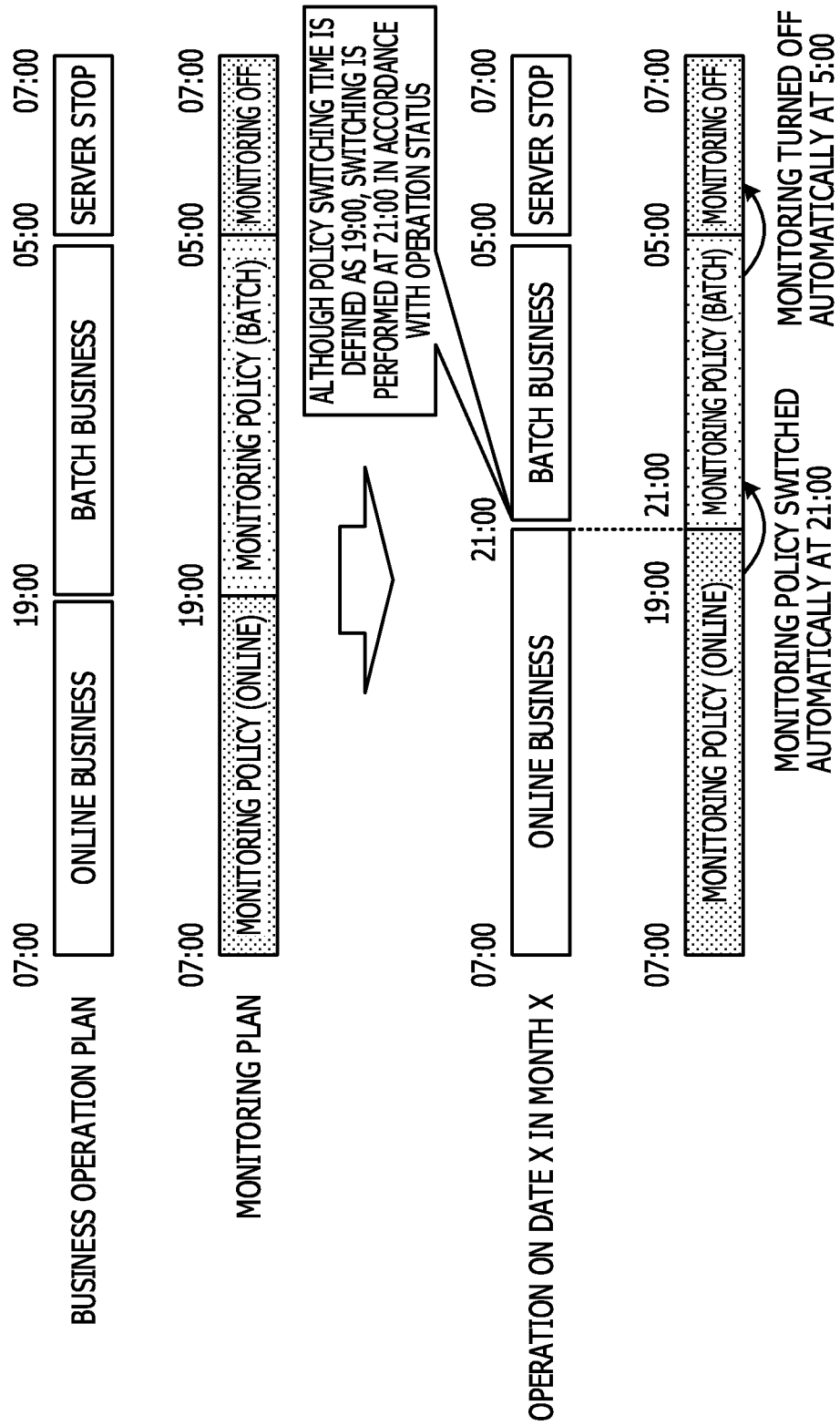
FIG. 12 depicts an example of switching the monitoring policy upon completion of transactional operation in a computer.

Next, an example of switching the monitoring policy upon completion of the transactional operation in a computer by the information processing apparatus 202 will be described with reference to FIG. 12. FIG. 12 depicts an example in which the information processing apparatus 202 functions as the monitoring control apparatus 400. Specifically, in the example in FIG. 12, the change unit 405 described with reference to FIG. 4 changes the monitoring policy.

FIG. 12 depicts an example of switching the monitoring policy upon completion of the transactional operation in a computer. As depicted in FIG. 12, it is assumed that the transactional operation in a computer of online business is planned to be performed at 7:00 to 19:00. It is also assumed that the transactional operation in a computer of batch business is planned to be performed at 19:00 to 5:00 on the next day. It is also assumed that the information processing apparatus 202 is planned to shut down at 5:00 and the information processing apparatus 202 is planned to start operating at 7:00.

It is also assumed that the monitoring policy at 7:00 to 19:00 is planned to be the monitoring policy of online business in accordance with the plan of online business. It is also assumed that the monitoring policy at 19:00 to 5:00 on the next day is planned to be the monitoring policy of batch business in accordance with the plan of batch business. It is also assumed that the monitoring policy at 5:00 to 7:00 is turned off in accordance with the shutdown plan of the information processing apparatus 202.

It is assumed that online business has not been completed until 21:00 because online business is delayed for operational reasons. In this case, as depicted in FIG. 10, the information processing apparatus 202 determines whether online business has been completed. Since the information processing apparatus 202 does not determines that online business has been completed even at 19:00, which is planned for online business, the information processing apparatus 202 does not switch the monitoring policy of online business. Since online business has been completed at 21:00, the information processing apparatus 202 determines that online business has been completed and switches the monitoring policy of online business to the monitoring policy of batch business.

The information processing apparatus 202 may thereby avoid occurrence of an error even when the information processing apparatus 202 monitors online business using the monitoring policy for batch business because it makes a transition to the monitoring policy for batch business when actually performing online business. In addition, the information processing apparatus 202 may switch the monitoring policy for online business to the monitoring policy for batch business when online business is actually completed. Accordingly, the information processing apparatus 202 is able to avoid occurrence of an error even when monitoring batch business using the monitoring policy for online business.

If the management apparatus functions as the monitoring control apparatus 400, when determining that the transactional operation in a computer has been completed normally in the information processing apparatus 202, the management apparatus may notify the information processing apparatus 202 to switch the monitoring policy. In addition, when the management apparatus monitors the information processing apparatus 202, the monitoring policy of the management apparatus may be switched.

(Switching of the Monitoring Policy During Shutdown)

Figure 13:
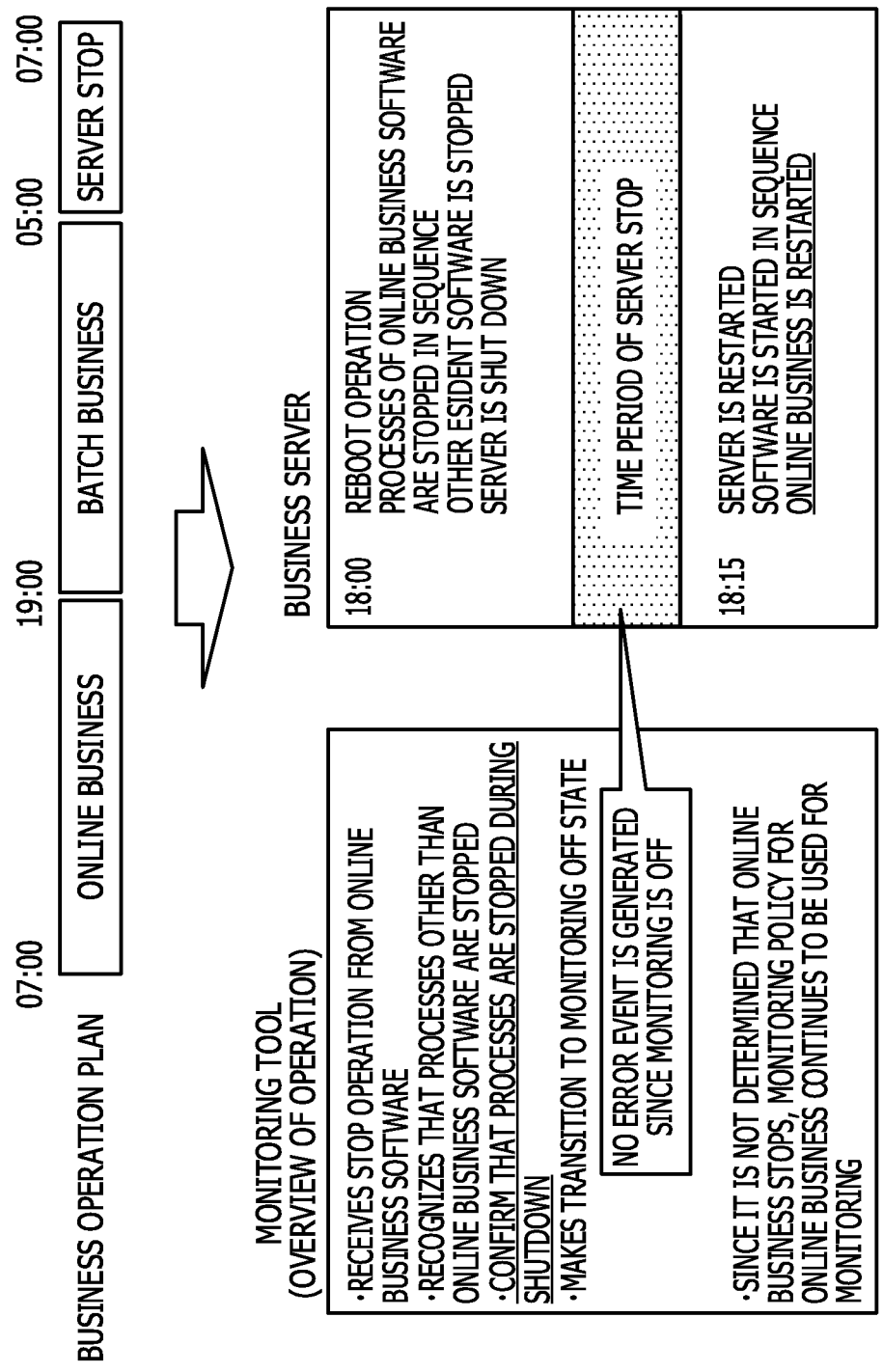
FIG. 13 depicts an example of switching the monitoring policy during shutdown.

Next, an example of switching the monitoring policy during shutdown of the information processing apparatus 202 will be described with reference to FIG. 13. FIG. 13 depicts an example in which the information processing apparatus 202 functions as the monitoring control apparatus 400. Specifically, in the example in FIG. 13, the change unit 405 described with reference to FIG. 4 changes the monitoring policy.

FIG. 13 depicts an example of switching of the monitoring policy during shutdown. If the transactional operation in a computer of online business is planned to be performed at 7:00 to 19:00 as depicted in FIG. 12, it is assumed that online business is completed when the information processing apparatus 202 is shut down at 18:00.

In this case, the information processing apparatus 202 determines whether the information processing apparatus 202 has been shut down, as depicted in FIG. 10. Then, since the information processing apparatus 202 determines that the information processing apparatus 202 has been shut down, the monitoring policy for online business is turned off once. Since online business itself is not completed, when the information processing apparatus 202 is started, the monitoring policy for online business is turned on again because it is determined that online business is restarted.

The information processing apparatus 202 may thereby avoid occurrence of an error even when the information processing apparatus 202 leaves the monitoring policy ON when actually performing online business. In addition, the information processing apparatus 202 may switch the monitoring policy to off when the information processing apparatus 202 is actually shut down, thereby avoiding occurrence of an error.

If the management apparatus functions as the monitoring control apparatus 400, when determining that the transactional operation in a computer has been completed normally during shutdown in the information processing apparatus 202, the management apparatus may notify the information processing apparatus 202 to switch the monitoring policy. In addition, when the management apparatus monitors the information processing apparatus 202, the monitoring policy of the management apparatus may be switched.

(Example of Using Tables for Transactional Operation in a Computer by Another Information Processing Apparatus 202)

Next, an example of using tables for transactional operation in a computer by another information processing apparatus 202 will be described with reference to FIG. 14.

Figure 14:
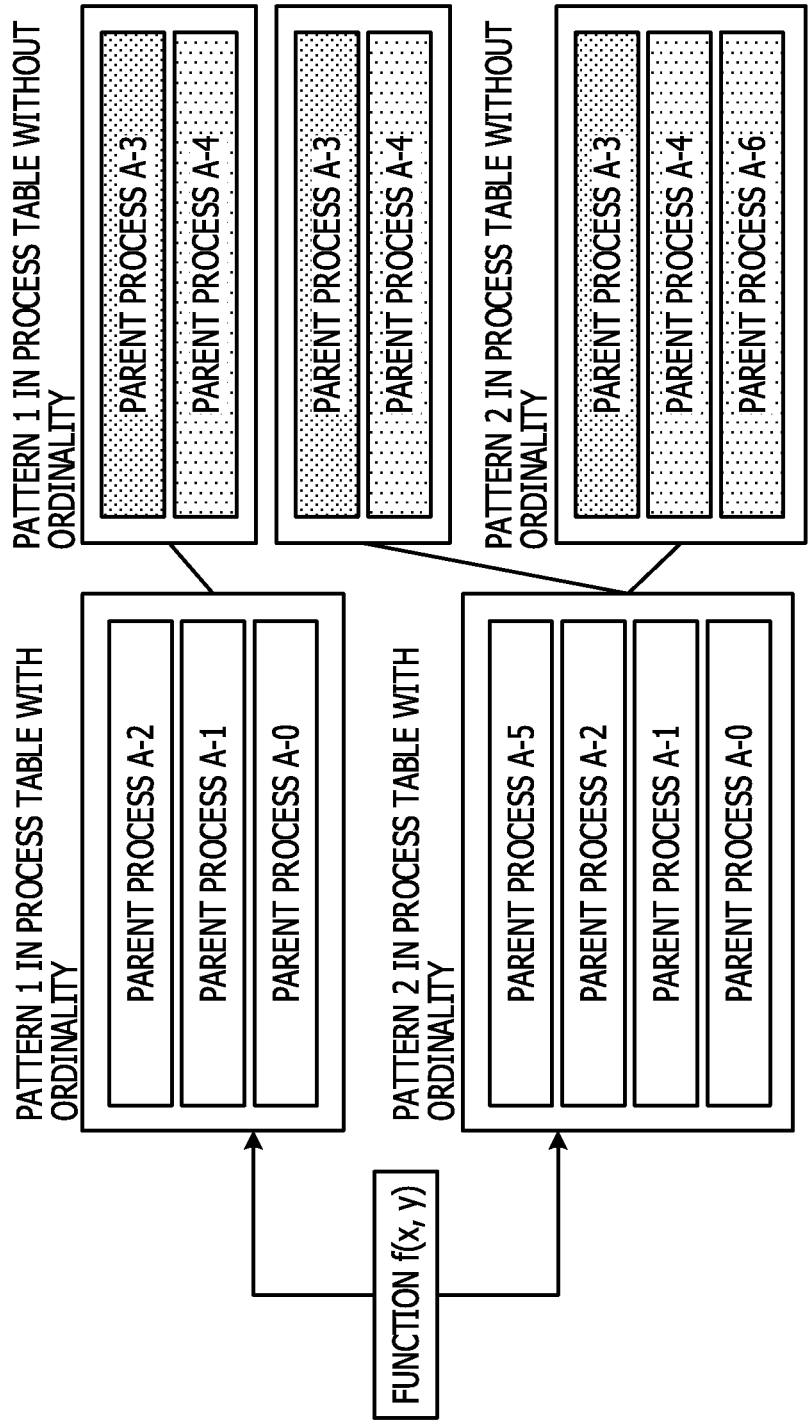
FIG. 14 depicts an example of using tables for transactional operation in a computer in another information processing apparatus.

FIG. 14 depicts an example in which the information processing apparatus 202 functions as the monitoring control apparatus 400. Specifically, the example in FIG. 14 depicts information stored in the storage unit 403 when using the process that have finished executing in the other information processing apparatus 202 upon completion of the transactional operation in a computer in the other information processing apparatus 202 described with reference to FIG. 4.

FIG. 14 depicts an example of using tables for transactional operation in a computer in the other information processing apparatus 202. The information processing apparatus 202 creates a pattern of the order table 801 and the combination table 802 for each of a plurality of information processing apparatuses 202 that perform the transactional operation in a computer.

Next, the information processing apparatus 202 detects that the processes have finished executing and determines whether the transactional operation in a computer has been completed based on any pattern in the same manner as in FIG. 10. The information processing apparatus 202 may provide a hash value for the pattern of each of the information processing apparatuses 202 and may select a pattern used to determine whether the transactional operation in a computer has been completed, based on the hash value.

For example, the information processing apparatus 202 provides a pattern with the hash value obtained by substituting the name x in the pattern and the number y of processes included in the process group with ordinality into hash function f(x, y). Next, the information processing apparatus 202 detects that a process has finished executing, calculates the hash value by substituting the process name and the number of processes included in the process group with ordinality into the hash function, and selects the pattern for which the calculated hash value is provided. Then, the information processing apparatus 202 determines whether the transactional operation in a computer has been completed, based on the pattern for which the selected hash value has been provided.

Accordingly, even when no pattern is created for the information processing apparatus 202, the information processing apparatus 202 may determine whether the transactional operation in a computer has been completed in the information processing apparatus 202 based on a patter for another information processing apparatus 202. The following case is taken as an example, in which processing in the transactional operation in a computer is changed and a process that finishes executing upon completion of the transactional operation in a computer is changed and in which no pattern is created for the information processing apparatus 202 after the processing in the transactional operation in a computer is changed. Even in this case, the information processing apparatus 202 may determine whether the transactional operation in a computer has been completed in the information processing apparatus 202 based on a patter for another information processing apparatus 202.

If the management apparatus functions as the monitoring control apparatus 400, the management apparatus may store various tables corresponding to each of the plurality of information processing apparatuses 202. Then, the management apparatus may determine whether the transactional operation in a computer has been completed in each of the information processing apparatuses 202 based on the various tables corresponding to each of the plurality of information processing apparatuses 202.

If the management apparatus functions as the monitoring control apparatus 400, the management apparatus may store the various tables corresponding to any of the plurality of information processing apparatuses 202. Then, the management apparatus may determine whether the transactional operation in a computer has been completed in each of the information processing apparatuses 202 using the various tables corresponding to any of the information processing apparatuses 202.

(Examples of Patterns Associated with Hash Values)

Figure 15:
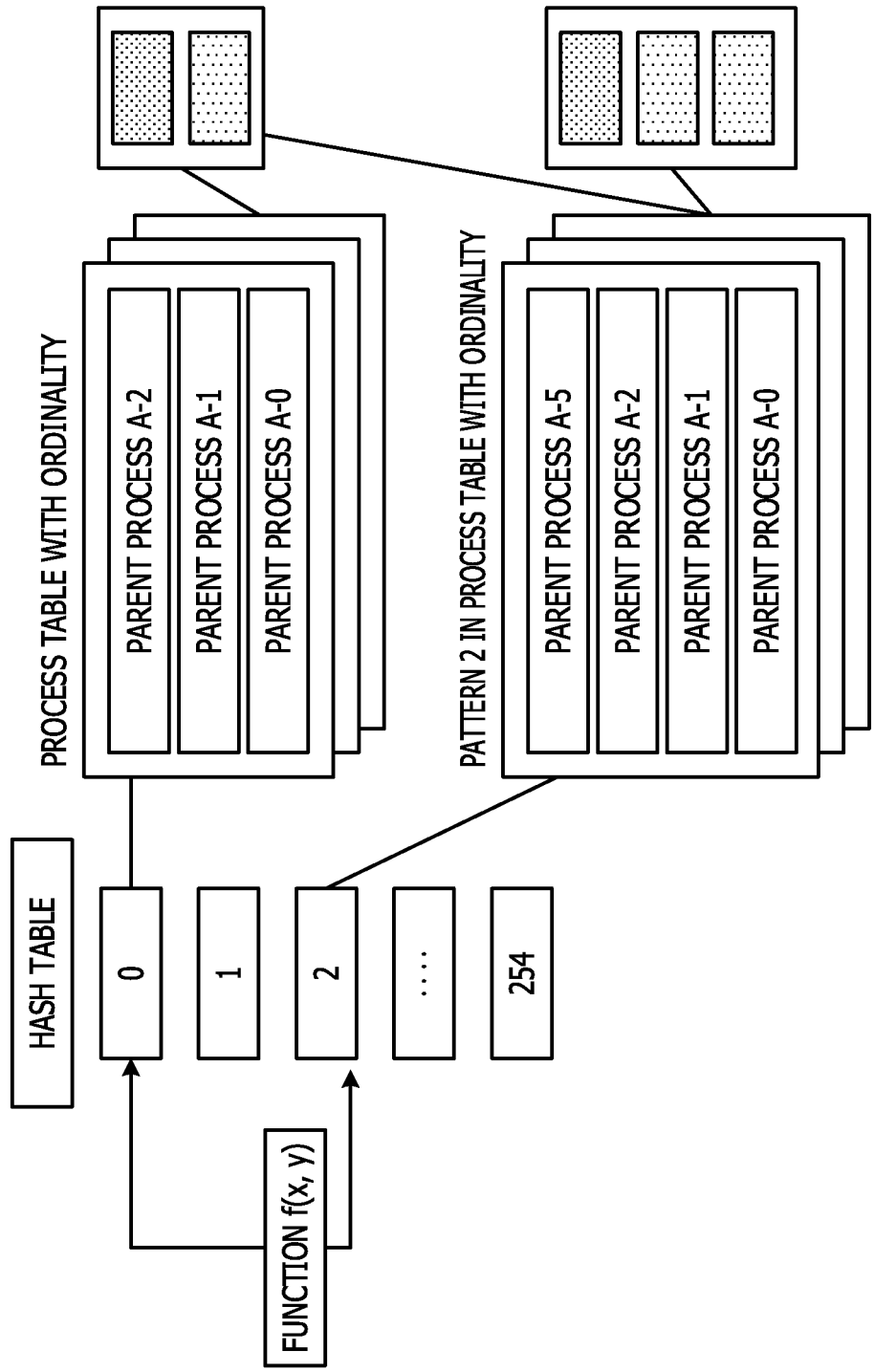
FIG. 15 depicts examples of patterns associated with hash values.

Next, examples of patterns associated with hash values will be described with reference to FIG. 15. FIG. 15 depicts an example in which the information processing apparatus 202 functions as the monitoring control apparatus 400. Specifically, the example in FIG. 15 depicts information stored in the storage unit 403 in detail when using the process that has finished executing in the other information processing apparatus 202 upon completion of the transactional operation in a computer in the information processing apparatus 202, which is described with reference to FIG. 4.

FIG. 15 depicts examples of patterns associated with hash values. The information processing apparatus 202 stores the table of hash values in the storage device 302. In addition, the information processing apparatus 202 stores, in the storage device 302, the order table 801 of the patterns for which hash values are provided with the order table 801 associated with hash values stored in the table of hash values. In addition, the information processing apparatus 202 stores, in the storage device 302, the combination table 802 of the patters associated with the order table 801 of the patters.

Accordingly, the information processing apparatus 202 does not have to select each of a plurality of patterns to determine whether the transactional operation in a computer has been completed in the information processing apparatus 202 based on the selected pattern. That is, the information processing apparatus 202 only has to select some of a plurality of patterns to determine whether the transactional operation in a computer has been completed in the information processing apparatus 202, thereby reducing processing loads.

If the management apparatus functions as the monitoring control apparatus 400, the management apparatus may store the various tables corresponding to each of the plurality of information processing apparatuses 202 as a patter associated with a hash value. In the following description, information including the various tables corresponding to each of the plurality of information processing apparatuses 202 stored as a pattern associated with a hash value may be referred to as global definition information.

(Example of Updating a Pattern)

Figure 16:
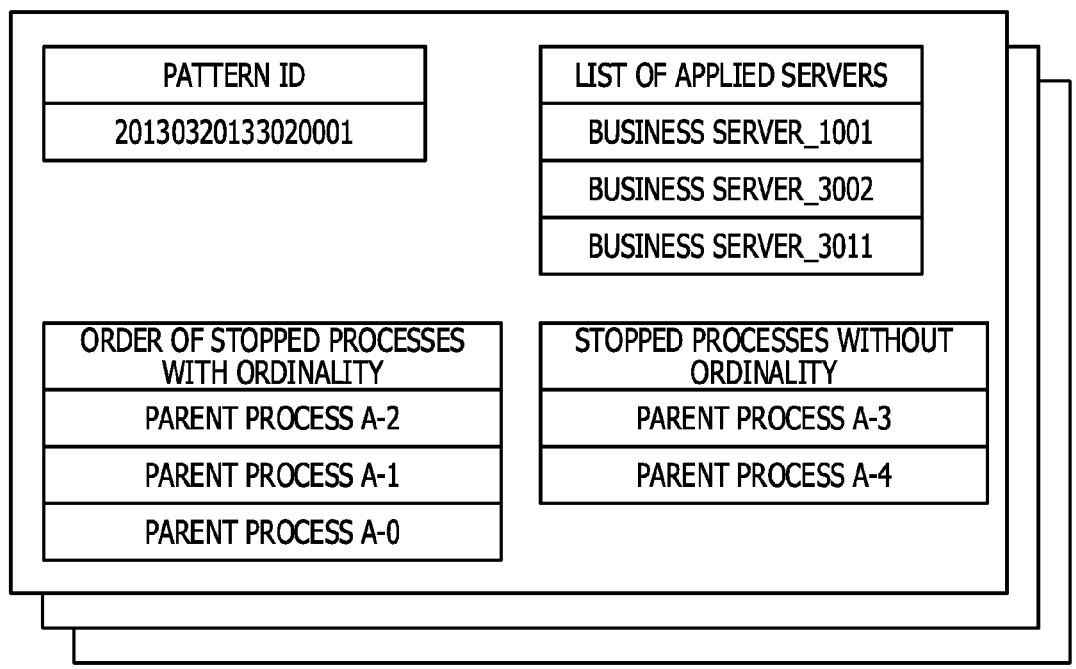
FIG. 16 depicts an example of updating a pattern.

Next, an example of updating patterns will be described with reference to FIG. 16. FIG. 16 depicts an example in which the information processing apparatus 202 functions as the monitoring control apparatus 400. Specifically, in the example in FIG. 16, the storage unit 403 described with reference to FIG. 4 stores data using the process that has finished executing in the other information processing apparatus 202 upon completion of the transactional operation in a computer in the other information processing apparatus 202.

FIG. 16 depicts an example of updating a pattern. As described above, the information processing apparatus 202 stores the table of hash values in the storage device 302 and stores a pattern associated with each hash value stored in the table of hash values in the storage device 302.

In addition, the information processing apparatus 202 stores the pattern ID associated with the pattern in the storage device 302. In addition, the information processing apparatus 202 stores, in the storage device 302, the name of the information processing apparatus 202 that determines whether the transactional operation in a computer has been completed based on the pattern with the name associated with the pattern ID.

Then, the information processing apparatus 202 creates a global check result table 1600 that stores the number of times completion of the transactional operation in a computer has been determined based on the pattern with the pattern ID with the number of times associated with the pattern ID.

In addition, if the number of times completion of the transactional operation in a computer has been determined based on the pattern exceeds a predetermined value, the information processing apparatus 202 updates the order table 801 and the combination table 802 corresponding thereto with the used pattern. The information processing apparatus 202 may thereby update various tables even when it becomes difficult to determine whether the transactional operation in a computer has been completed by using the order table 801 and the combination table 802 corresponding to the information processing apparatus 202 since the content of the transactional operation in a computer has been changed.

(Example of a Monitoring Definition Procedure)

Next, an example of a monitoring definition procedure performed by the information processing apparatus 202 will be described with reference to FIG. 17.

Figure 17:
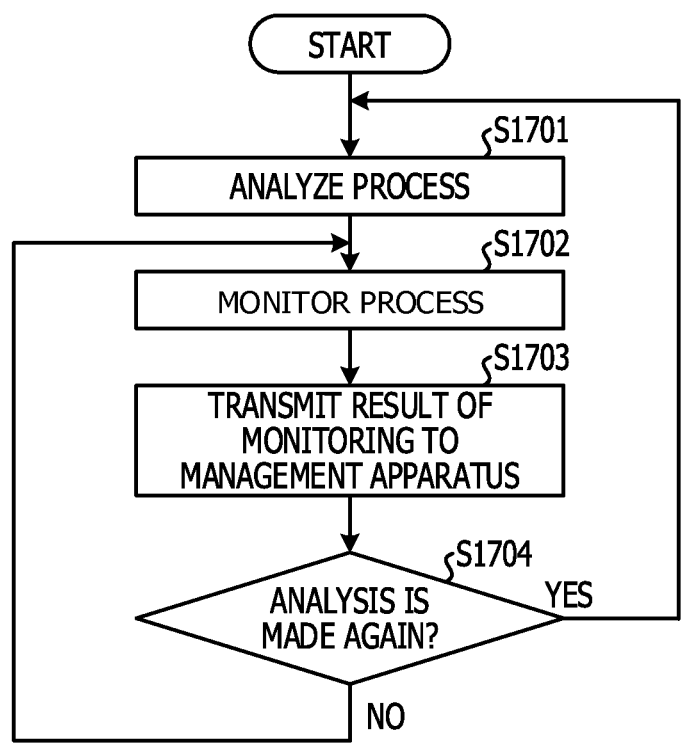
FIG. 17 is a flowchart depicting an example of a monitoring definition procedure.

FIG. 17 is a flowchart depicting an example of the monitoring definition procedure. In FIG. 17, the information processing apparatus 202 analyzes processes (step S1701). Next, the information processing apparatus 202 monitors processes (step S1702). Then, the information processing apparatus 202 transmits the monitoring result to the management apparatus (step S1703).

Next, the information processing apparatus 202 determines whether the processes are analyzed again (step S1704). When the processes are analyzed again (Yes in step S1704), the information processing apparatus 202 returns to the processing in step S1701. When the processes are not analyzed again (No in step S1704), the information processing apparatus 202 returns to the processing in step S1702.

(Example of a Process Analysis Procedure)

Next, an example of a process analysis procedure performed by the information processing apparatus 202 will be described with reference to FIG. 18.

Figure 18:
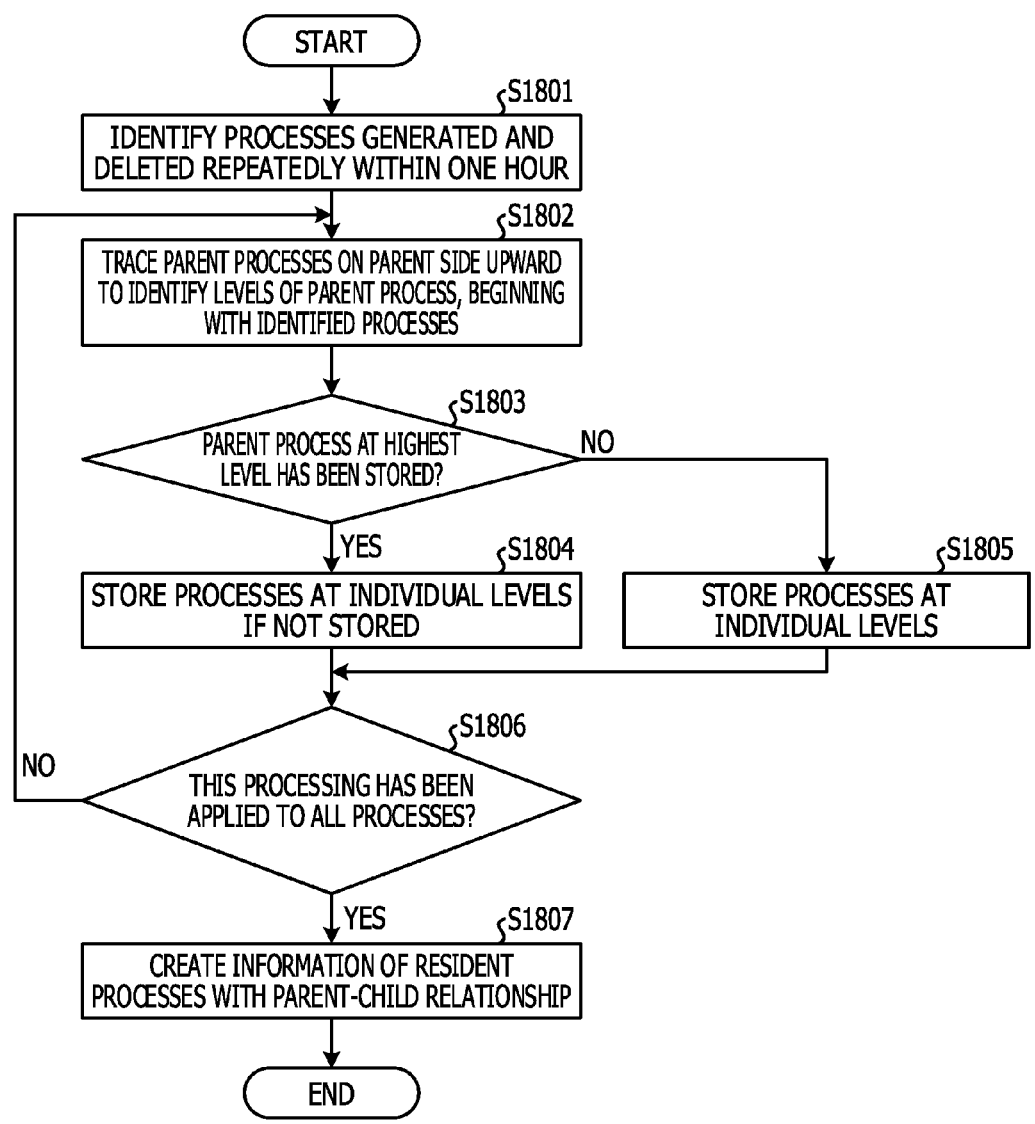
FIG. 18 is a flowchart depicting an example of a process analysis procedure.

FIG. 18 is a flowchart depicting an example of the process analysis procedure. In FIG. 18, the information processing apparatus 202 identifies the processes that have been generated and deleted repeatedly within one hour (step S1801). Next, the information processing apparatus 202 traces the parent processes on the parent side upward beginning with the identified processes to identify the levels of the parent process (step S1802).

Then, the information processing apparatus 202 determines whether the parent process at the highest level on the parent side has been stored (step S1803). If the parent process has been stored (Yes in step S1803), the information processing apparatus 202 stores the processes at the individual levels if they are not stored (step S1804), and makes a transition to the processing in step S1806.

In contrast, if the parent process has not been stored (No in step S1803), the information processing apparatus 202 stores the processes at the individual levels including the parent process at the highest level (step S1805) and makes a transition to the processing in step S1806.

In step S1806, the information processing apparatus 202 determines whether all processes have been processed (step S1806). If all processes have not been processed (No in step S1806), the information processing apparatus 202 returns to the processing in step S1802.

In contrast, if all processes have been processed (Yes in step S1806), the information processing apparatus 202 creates information of resident processes with a parent-child relationship (step S1807) and finishes the process analysis.

(Example of a Table Creation Procedure)

Next, an example of a table creation procedure performed by the information processing apparatus 202 will be described with reference to FIG. 19.

Figure 19:
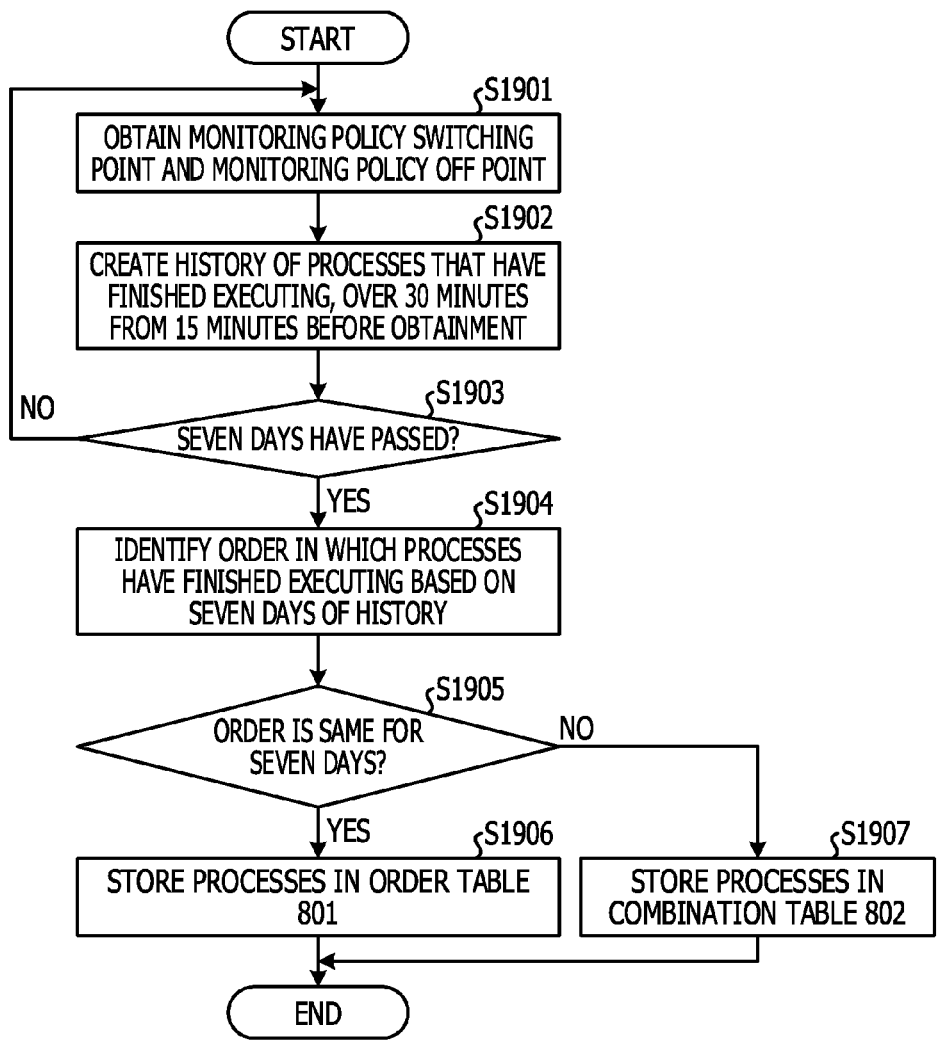
FIG. 19 is a flowchart depicting an example of a table creation procedure.

FIG. 19 is a flowchart depicting an example of the table creation procedure. In FIG. 19, the information processing apparatus 202 obtains the monitoring policy switching point and the monitoring policy off point from monitoring policy definition information (step S1901). Next, the information processing apparatus 202 creates the history of the processes that have finished executing, over 30 minutes from 15 minutes before the obtainment (step S1902).

Then, the information processing apparatus 202 determines whether seven days have passed (step S1903). If the history creation period is set to seven days, the information processing apparatus 202 is able to create various tables, excluding processes such as those finished accidentally at the monitoring policy switching point only on a certain day of the week in consideration of variations in the processes that have finished executing for each day of the week. The history creation period may be 24 hours or one month. In addition, the history creation period may be changed as appropriate depending on the content of transactional operation in a computer, the content of monitoring policy, the status of the information processing apparatus 202, the date of creation of various tables, or the like.

If seven days have not passed (No in step S1903), the information processing apparatus 202 returns to the processing in step S1901. In contrast, if seven days have passed (Yes in step S1903), the information processing apparatus 202 identifies the order in which the processes have finished executing based on seven days of history (step S1904). Next, the information processing apparatus 202 determines whether the order in which the processes have finished executing is the same for each of the seven days (step S1905).

If the order is the same (Yes in step S1905), the information processing apparatus 202 stores the processes in the order table 801 (step S1906) and finishes the table creation. In contrast, if the order is not the same (No in step S1905), the information processing apparatus 202 stores the processes in the combination table 802 (step S1907) and finishes the table creation.

(Example of a Table Modification Procedure)

Next, an example of a table modification procedure performed by the information processing apparatus 202 will be described with reference to FIG. 20.

Figure 20:
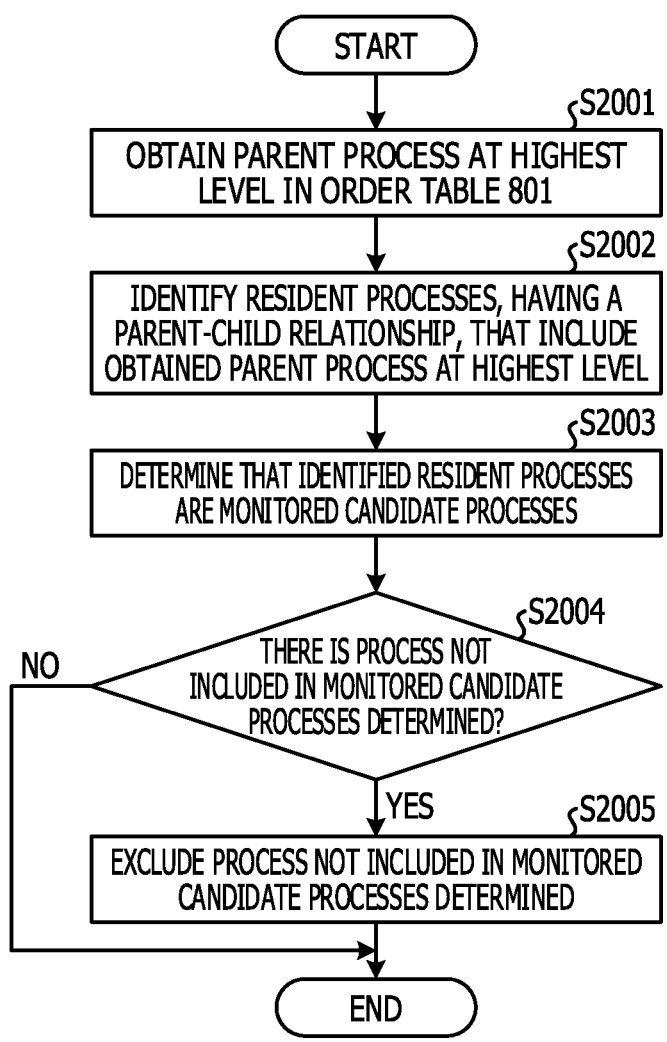
FIG. 20 is a flowchart depicting an example of a table modification procedure.

FIG. 20 is a flowchart depicting an example of the table modification procedure. In FIG. 20, the information processing apparatus 202 obtains the parent process at the highest level in the order table 801 (step S2001). Next, the information processing apparatus 202 identifies the resident processes, having a parent-child relationship, that include the obtained parent process at the highest level (step S2002). Then, the information processing apparatus 202 determines the identified resident processes to be the monitored candidate processes (step S2003).

Next, the information processing apparatus 202 determines whether the order table 801 and the combination table 802 include a process not included in the monitored candidate processes determined (step S2004). If such a process is not included (No in step S2004), the information processing apparatus 202 finishes the table creation.

In contrast, if such a process (Yes in step S2004) is included, the information processing apparatus 202 excludes the process not included in the monitored candidate processes from the order table 801 and the combination table 802 and updates the order table 801 and the combination table 802 (step S2005). Then, the information processing apparatus 202 finishes the table modification.

(Example of a Determination Procedure)

Next, an example of a determination procedure performed by the information processing apparatus 202 will be described with reference to FIG. 21.

Figure 21:
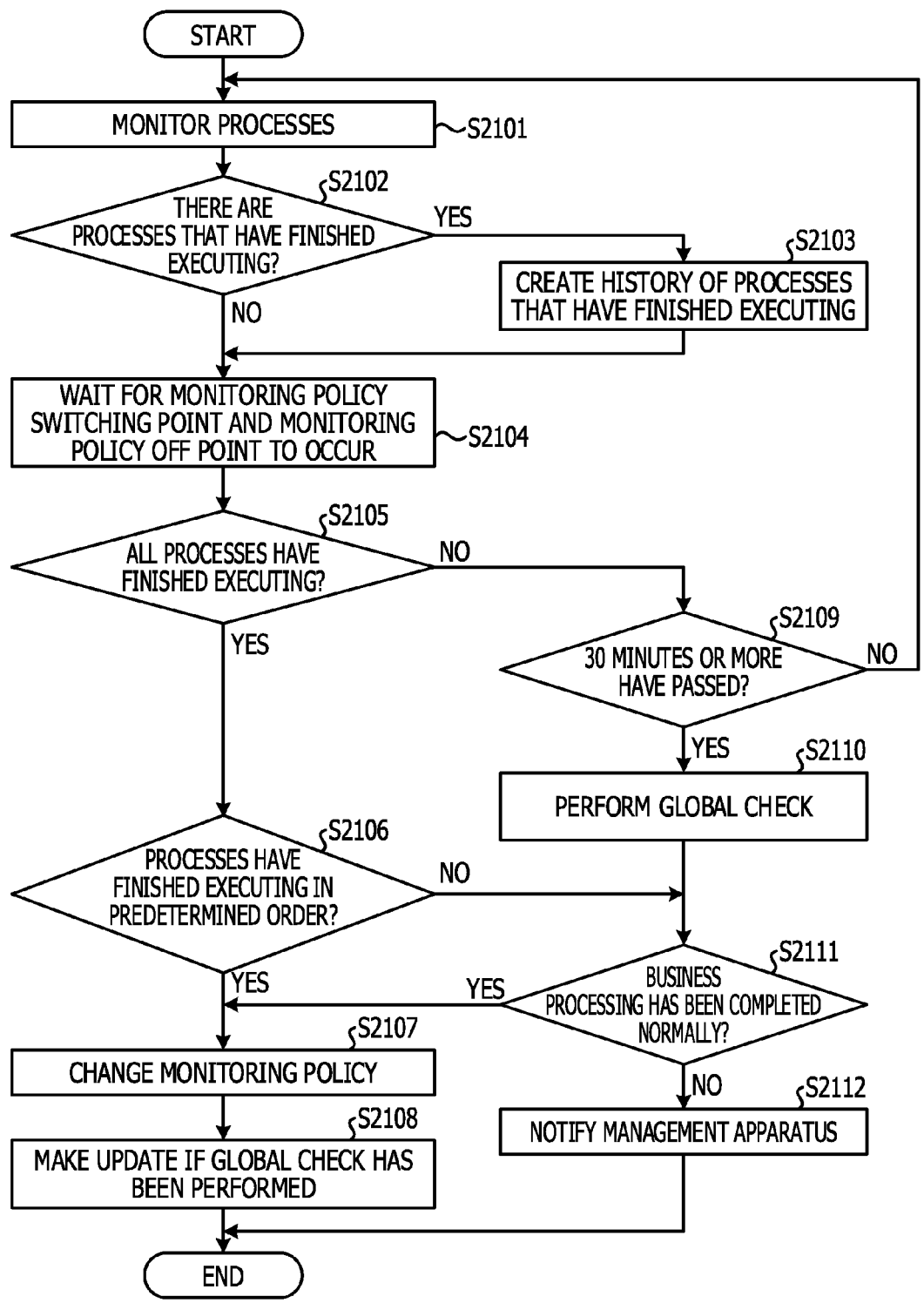
FIG. 21 is a flowchart depicting an example of a determination procedure.

FIG. 21 is a flowchart depicting an example of the determination procedure. In FIG. 21, the information processing apparatus 202 monitors the processes listed in the order table 801 and the combination table 802 (step S2101). Next, the information processing apparatus 202 determines whether there are processes that have finished executing based on the monitoring results (step S2102).

If such a process is detected (Yes in step S2102), the information processing apparatus 202 creates the history of processes that have finished executing (step S2103) and makes a transition to the processing in step S2104.

In contrast, if such a process is not detected (No in step S2102), the information processing apparatus 202 waits for the monitoring policy switching point and the monitoring policy off point to come (step S2104). Next, the information processing apparatus 202 determines whether all processes listed in the order table 801 and the combination table 802 have finished executing (step S2105).

If all processes have finished executing (Yes in step S2105), the information processing apparatus 202 makes a transition to the processing in step S2106. In contrast, if all processes have not been finished executing (No in step S2105), the information processing apparatus 202 makes a transition to the processing in step S2109.

In step S2106, the information processing apparatus 202 determines whether the processes listed in the order table 801 have finished executing in a defined order (step S2106). If the processes have finished executing in the defined order (Yes in step S2106), the information processing apparatus 202 makes a transition to the processing in step S2107. In contrast, if the processes have not finished executing in the defined order (No in step S2106), the information processing apparatus 202 makes a transition to the processing in step S2111.

In step S2107, the information processing apparatus 202 changes the monitoring policy (step S2107). If a global check has been performed, the information processing apparatus 202 updates the order table 801 and the combination table 802 (step S2108) and finishes the determination.

In step S2109, the information processing apparatus 202 determines whether 30 minutes or more have passed after creation of history (step S2109). If 30 minutes or more have not passed (No in step S2109), the information processing apparatus 202 returns to the processing in step S2101. In contrast, if 30 minutes or more have passed (Yes in step S2109), the information processing apparatus 202 performs a global check (step S2110) and makes a transition to the processing in step S2111.

In step S2111, the information processing apparatus 202 determines whether the transactional operation in a computer has been completed normally (step S2111). If the transactional operation in a computer is completed normally (Yes in step S2111), the information processing apparatus 202 makes a transition to the processing in step S2107.

In contrast, if the transactional operation in a computer is not completed normally (No in step S2111), the information processing apparatus 202 notifies the management apparatus (step S2112) and finishes the determination.

(Example of a Global Check Procedure)

Next, an example of a global check procedure performed by the information processing apparatus 202 will be described with reference to FIG. 22.

Figure 22:
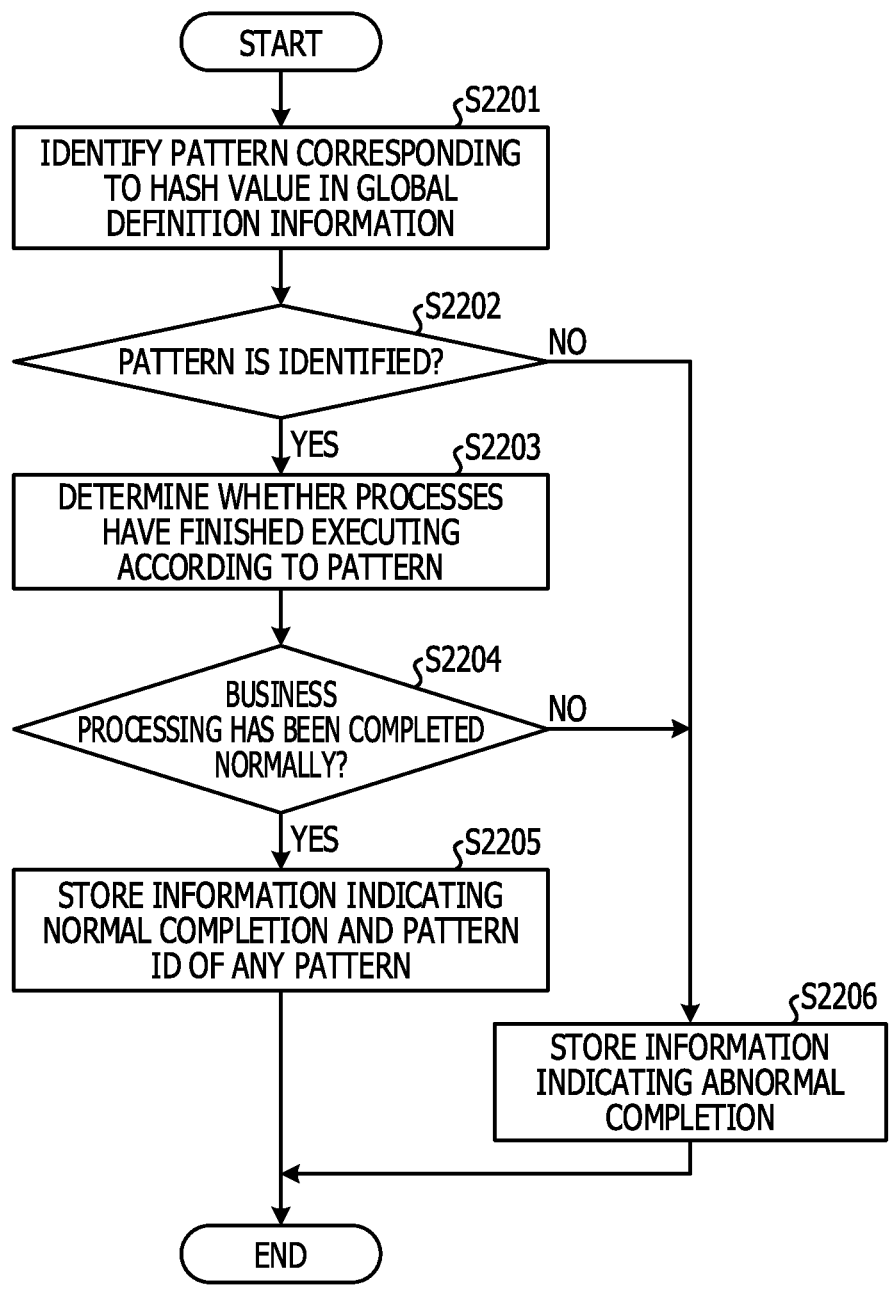
FIG. 22 is a flowchart depicting an example of a global check procedure.

FIG. 22 is a flowchart depicting an example of the global check procedure. In FIG. 22, the information processing apparatus 202 identifies the pattern corresponding to a hash value in global definition information, based on the history (step S2201). Next, the information processing apparatus 202 determines whether the pattern has been identified (step S2202).

If the pattern has been identified (Yes in step S2202), the information processing apparatus 202 determines whether the processes have finished executing according to any of the identified patterns based on the history (step S2203). Next, the information processing apparatus 202 determines whether the transactional operation in a computer has been completed normally based on the determined result (step S2204).

If the transactional operation in a computer has been completed normally (Yes in step S2204), the information processing apparatus 202 stores information indicating normal completion and the pattern ID of any pattern (step S2205) and finishes the global check.

In contrast, if the pattern has not been identified in step S2202 (No in step S2202) and if the transactional operation in a computer has not been completed normally in step S2204 (No in step S2204), the information processing apparatus 202 stores information indicating abnormal completion (step S2206) and finishes the global check.

(Example of an Update Procedure)

Next, an example of an update procedure performed by the information processing apparatus 202 will be described with reference to FIG. 23.

Figure 23:
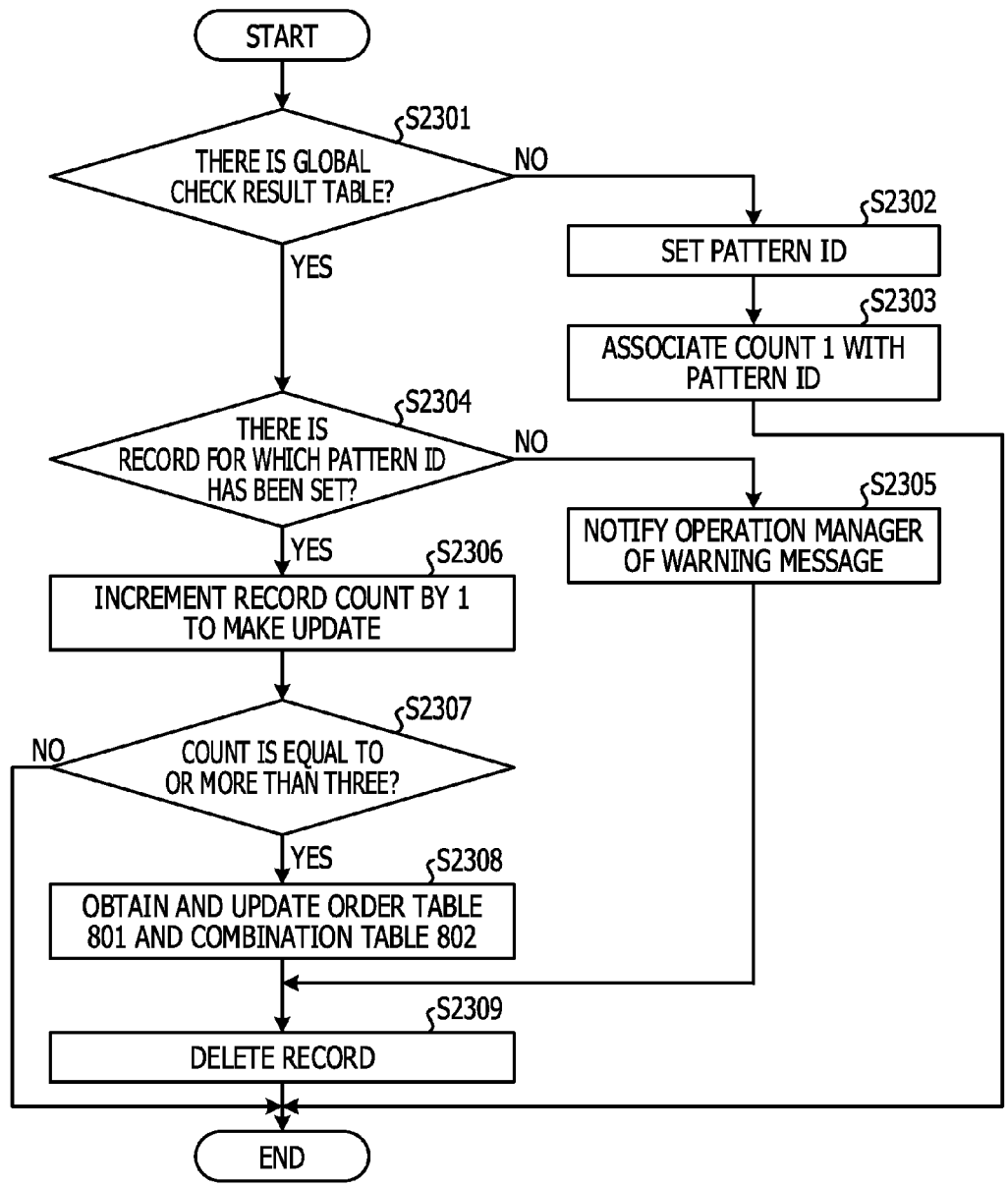
FIG. 23 is a flowchart depicting an example of an update procedure.

FIG. 23 is a flowchart depicting an example of the update procedure. In FIG. 23, the information processing apparatus 202 determines whether there is a global check result table (step S2301).

If there is not a global check result table (No in step S2301), the information processing apparatus 202 creates a global check result table in which the pattern ID of the pattern used for the global check has been set (step S2302). Next, the information processing apparatus 202 sets the pattern ID associates with count 1 (step S2303). Then, the information processing apparatus 202 finishes the update.

In contrast, if there is a global check result table (Yes in step S2301), the information processing apparatus 202 determines whether there is a record for which a pattern ID has been set, in the global check result table (step S2304). The information processing apparatus 202 determines whether there is a record for which the pattern ID has been set (step S2304). If there is not such a record (No in step S2304) in the global check result table, the information processing apparatus 202 notifies the operation manager of a warning message (step S2305) and makes a transition to the processing in step S2309.

In contrast, if there is such a record in the global check result table (Yes in step S2304), the information processing apparatus 202 increments the record count by 1 to make update (step S2306). Next, the information processing apparatus 202 determines whether the count is equal to or more than three (step S2307). If the count is less than three (No in step S2307), the information processing apparatus 202 finishes the update.

In contrast, if the count is three or more (Yes in step S2307), the information processing apparatus 202 obtains the order table 801 and the combination table 802 from the information processing apparatus 202 based on the name of the information processing apparatus 202 associated with the pattern ID and updates them (step S2308). Next, the information processing apparatus 202 deletes the record in the global check result table (step S2309). Then, the information processing apparatus 202 finishes the update.

As described above, the monitoring control program is able to detect the process that has finished executing in the information processing apparatus 202 and determine that the transactional operation in a computer has been completed when the process that finishes executing upon completion of the transactional operation in a computer has finished executing. The monitoring control program may thereby detect the timing at which the monitoring policy is switched.

In addition, if the monitoring control program determines that a series of processes have finished executing in the defined order with reference to the order table 801 and the combination table 802 and the remaining processes have finished executing, the monitoring control program may determine that the transactional operation in a computer has been completed normally. The monitoring control program may thereby improve the accuracy of determining whether the transactional operation in a computer has been completed.

If the monitoring control program determines that the series of processes have finished executing in the defined order, the remaining processes have finished executing, and a shutdown has been performed, the monitoring control program may determine that the transactional operation in a computer has been completed during shutdown of the information processing apparatus 202. The monitoring control program may thereby determine whether the transactional operation in a computer has been completed during shutdown with reference to information stored in the order table 801, the combination table 802, and the supplementary table 901.

The information of the process may include the information of a process that finishes executing upon completion of other transactional operation in a computer that is completed in conjunction with the transactional operation in a computer. The monitoring control program may thereby identify, in detail, the process that finishes executing upon completion of the transactional operation in a computer and improve the accuracy of determining whether the transactional operation in a computer has been completed.

The information of the process may be the information of the process that has finished executing in a different information processing apparatus 202 from the information processing apparatus 202 upon completion of the transactional operation in a computer in a different information processing apparatus 202 or during shutdown of a different information processing apparatus 202.

The case in which the information of the process that finishes executing in the information processing apparatus 202 upon completion of the transactional operation in a computer in the information processing apparatus 202 is not identified is taken as an example. Even in this case, the monitoring control program is able to determine whether the transactional operation in a computer has been completed in the information processing apparatus 202 using information of a process that finishes executing in another information processing apparatus 202 upon completion of the transactional operation in a computer in the other information processing apparatus 202.

The following case is taken as an example, in which the type of a process that finishes executing upon completion of the transactional operation in a computer changes as the content of the transactional operation in a computer changes and in which the information of a process that finishes executing in the information processing apparatus 202 upon completion of the transactional operation in a computer in the information processing apparatus 202 is not identified. Even in this case, the monitoring control program is able to determine whether the transactional operation in a computer has been completed in the information processing apparatus 202 using information of a process that finishes executing upon completion of the transactional operation in a computer in another information processing apparatus 202.

In addition, the case in which the information processing apparatus 202 is newly added to the network 210 is taken as an example. Even in this case, the monitoring control program is able to determine whether the transactional operation in a computer has been completed in the information processing apparatus 202 that has been newly added, using information of a process that finishes executing upon completion of the transactional operation in a computer in another information processing apparatus 202.

The monitoring control program is able to change the monitoring policy when the transactional operation in a computer is determined to be completed. The monitoring control program is thereby able to monitor the transactional operation in a computer using the appropriate monitoring policy. This avoids outputting an unwanted error message even if the monitoring system monitors the transactional operation in a computer using an inappropriate monitoring policy. In addition, the number of error messages in the monitoring system is reduced, thereby achieving cost reduction in the maintenance of the monitoring system.

It is possible to use the method that performs synchronization with the monitoring policy during startup or termination of the middleware that controls the transactional operation in a computer. However, the reason why the middleware has been started or terminated is unknown in this case. Therefore, it is difficult to determine whether the transactional operation in a computer has been completed normally and switched to other transactional operation in a computer or the transactional operation in a computer has been completed temporarily during shutdown of the information processing apparatus. Accordingly, it is difficult to determine whether the monitoring policy has to be switched or turned off, possibly leading to an improper setting of the monitoring policy. On the other hand, depending on whether the transactional operation in a computer has been completed normally and switched to other transactional operation in a computer or the transactional operation in a computer has been completed temporarily during shutdown of the information processing apparatus, the information processing apparatus may set the appropriate monitoring policy individually. In this case, each time the middleware is added or replaced, the setting of synchronization with the monitoring policy has to be modified, thereby increasing the maintenance cost of the monitoring system. On the other hand, the information processing apparatus may automatically create various tables for determining whether the transactional operation in a computer has been completed, thereby reducing the maintenance cost of the monitoring system.

If the name of the process related to the shutdown of the information processing apparatus is stored, it is possible to detect that the information processing apparatus has been shut down by detecting the startup of the process. In this case, however, if there is a dummy program with the same name to avoid operation error, it is difficult to determine whether the information processing apparatus has been shut down. On the other hand, if the information processing apparatus automatically detects, in advance, the process that finishes executing during shutdown of the information processing apparatus and determines whether the process has finished executing actually, it is possible to determine whether the information processing apparatus has been shut down.

The monitoring control method described in the present embodiment is achieved by causing a computer such as a personal computer or workstation to execute a program prepared in advance. The monitoring control program is recorded in a computer-readable recording medium such as a hard disk, flexible disk, CD-ROM, MO, and DVD. The monitoring control program is read from such a recording medium and then executed by the computer. The monitoring control program may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A method comprising:
identifying a plurality of first processes that are executed in a transactional operation and that are completed in common in a plurality of periods;
extracting, from the plurality of first processes, a plurality of second processes that call other process;
extracting, from the plurality of second processes, a plurality of third processes that are completed in a first order in common in the plurality of periods; and
detecting completion of a plurality of fourth processes executed in a computer, the plurality of fourth processes being completed in a second order;
determining whether the plurality of fourth processes correspond the plurality of third processes;
determining whether the second order corresponds to the first order;
specifying a fifth process which is completed in accordance with shutdown of the computer; and
determining that the transactional operation is completed when the plurality of fourth processes corresponds to the plurality of third processes and the second order corresponds to the first order and the fifth process is completed.

2. The method of claim 1, further comprising:
specifying information that indicates a sixth process relating to another transactional operation that is completed in conjunction with the transactional operation.

3. The method of claim 1, further comprising:
specifying information that indicates a seventh process that is completed in another computer in accordance with one of completion of another transactional operation in the another computer and shutdown of the another computer.

4. The method of claim 1, further comprising
changing a monitoring policy to determine whether the transactional operation normally operates, to another monitoring policy to determine whether another transactional operation normally operates, when it is determined that the transactional operation is completed.

5. An apparatus comprising:
a memory; and
a processor coupled to the memory and configured to
identify a plurality of first processes that are executed in a transactional operation and that are completed in common in a plurality of periods;
extract, from the plurality of first processes, a plurality of second processes that call other process;
extract, from the plurality of second processes, a plurality of third processes that are completed in a first order in common in the plurality of periods; and
detect completion of a plurality of fourth processes executed in a computer, the plurality of fourth processes being completed in a second order;
determine whether the plurality of fourth processes correspond the plurality of third processes;
determine whether the second order corresponds to the first order;
specify a fifth process which is completed in accordance with shutdown of the computer; and
determine that the transactional operation is completed when the plurality of fourth processes corresponds to the plurality of third processes and the second order corresponds to the first order and the fifth process is completed.

* * * * *